United States Patent
Jeon et al.

(10) Patent No.: US 12,355,972 B2
(45) Date of Patent: Jul. 8, 2025

(54) IMAGE ENCODING/DECODING METHOD AND APPARATUS USING BDPCM, AND RECORDING MEDIUM STORING BITSTREAM

(71) Applicant: Research & Business Foundation Sungkyunkwan University, Suwon-si (KR)

(72) Inventors: Byeung Woo Jeon, Seongnam-si (KR); Jee Yoon Park, Seoul (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 216 days.

(21) Appl. No.: 17/791,698

(22) PCT Filed: Jan. 11, 2021

(86) PCT No.: PCT/KR2021/000309
§ 371 (c)(1),
(2) Date: Jul. 8, 2022

(87) PCT Pub. No.: WO2021/141462
PCT Pub. Date: Jul. 15, 2021

(65) Prior Publication Data
US 2023/0044258 A1  Feb. 9, 2023

(30) Foreign Application Priority Data
Jan. 10, 2020  (KR) .................. 10-2020-0003617

(51) Int. Cl.
*H04N 19/136* (2014.01)
*H04N 19/176* (2014.01)
*H04N 19/186* (2014.01)

(52) U.S. Cl.
CPC ......... *H04N 19/136* (2014.11); *H04N 19/176* (2014.11); *H04N 19/186* (2014.11)

(58) Field of Classification Search
CPC .... H04N 19/176; H04N 19/186; H04N 19/70; H04N 11/046; H04N 19/60; H04N 19/61
See application file for complete search history.

(56) References Cited

U.S. PATENT DOCUMENTS

| | | | | |
|---|---|---|---|---|
| 8,761,531 B2 * | 6/2014 | Goma | ..................... | H04N 19/46 382/251 |
| 12,003,765 B2 * | 6/2024 | Choi | ..................... | H04N 19/573 |

(Continued)

FOREIGN PATENT DOCUMENTS

| | | |
|---|---|---|
| CN | 105684442 A | 6/2016 |
| CN | 106256127 A | 12/2016 |

(Continued)

OTHER PUBLICATIONS

Bross, Benjamin, et al. "Versatile Video Coding (Draft 7)" JVET-P2001-vE, Joint Video Experts Team (JVET) of ITU-T SG 16 WP 3 and ISO/IEC JTC 1/SC 29/WG 11, 16th Meeting: Geneva, CH, Oct. 1-11, 2019, (310 pages).

(Continued)

*Primary Examiner* — Daniel Chang
(74) *Attorney, Agent, or Firm* — NSIP Law

(57) ABSTRACT

An image encoding/decoding method and apparatus for performing encoding/decoding using BDPCM are provided. The image decoding method performed by an image decoding apparatus may comprise obtaining first information indicating whether block-based differential pulse coded modulation (BDPCM) is applicable to a current image, obtaining second information indicating whether to apply the BDPCM to a current block in the current image based on the first information, obtaining third information indicating a prediction direction of the BDPCM based on the second (Continued)

| | |
|---|---|
| sps_transform_skip_enabled_flag | u(1) |
| if( sps_transform_skip_enabled_flag ) { | |
|     sps_bdpcm_luma_enabled_flag | u(1) |
|     if( chroma_format_idc  >= 2 ) | |
|         sps_bdpcm_chroma_enabled_flag | u(1) |
| } | | information, and applying the BDPCM to the current block based on the prediction direction of the BDPCM. The first information may indicate whether BDPCM is enabled for both a luma component and a chroma component of the current block.

23 Claims, 16 Drawing Sheets

(56) References Cited

U.S. PATENT DOCUMENTS

| | | | | |
|---|---|---|---|---|
| 2011/0007979 | A1* | 1/2011 | Goma | H04N 1/646 |
| | | | | 382/239 |
| 2015/0063454 | A1 | 3/2015 | Guo et al. | |
| 2021/0176479 | A1* | 6/2021 | Liao | H04N 19/172 |
| 2022/0038698 | A1* | 2/2022 | Koo | H04N 19/186 |
| 2022/0086444 | A1* | 3/2022 | Piao | H04N 19/13 |
| 2022/0132133 | A1* | 4/2022 | Jang | H04N 19/132 |
| 2022/0256160 | A1* | 8/2022 | Yoo | H04N 19/132 |
| 2022/0264120 | A1* | 8/2022 | Wang | H04N 19/70 |
| 2022/0295101 | A1* | 9/2022 | Cai | H04N 19/12 |
| 2022/0360820 | A1* | 11/2022 | Chiang | H04N 19/136 |

FOREIGN PATENT DOCUMENTS

| | | |
|---|---|---|
| CN | 110392257 A | 10/2019 |
| KR | 10-2016-0016861 A | 2/2016 |
| KR | 10-2018-0024702 A | 3/2018 |
| WO | WO 2014/197691 A1 | 12/2014 |
| WO | WO-2021128281 A1 * | 7/2021 ............. H04N 19/12 |

OTHER PUBLICATIONS

Nalci, Alican, et al. "CE3-2.4: Luma and Chroma BDPCM for Lossless Coding with Regular Residual Coding" JVET-Q0089-v2, Joint Video Experts Team (JVET) of ITU-T SG 16 WP 3 and ISO/IEC JTC 1/SC 29/WG 11, 17th Meeting: Brussels, BE, Jan. 7-17, 2020, (3 pages).

Sullivan, Gary, et al. "Meeting Report of the 17th Meeting of the Joint Video Experts Team (JVET), Brussels, BE, Jan. 7-17, 2020" JVET-Q2000-v2, Joint Video Experts Team (JVET) of ITU-T SG 16 WP 3 and ISO/IEC JTC 1/SC 29/WG 11, 17th Meeting: Brussels, BE, Jan. 7-17, 2020, (379 pages).

Bross, Benjamin et al. "Versatile Video Coding (Draft 7)" *Joint Video Experts Team (JVET)* of ITU-T- SG 16 WP 3 and ISO/IEC JTC 1/SC 29/WG 11 16$^{th}$ Meeting: Geneva, CH, (Oct. 1-11, 2019).

Bross, Benjamin et al. "Algorithm description for Versatile Video Coding and Test Model 7(VTM 7)" *Joint Video Experts Team (JVET)* of ITU-T- SG 16 WP 3 and ISO/IEC JTC 1/SC 29/WG 11 16th Meeting: Geneva, CH, (Oct. 1-11, 2019).

Bross, Benjamin et al. "CE8-related:BDPCM for chroma" *Joint Video Experts Team (JVET)* of ITU-T- SG 16 WP 3 and ISO/IEC JTC 1/SC 29/WG 11 16$^{th}$ Meeting: Geneva, CH, (Oct. 1-11, 2019).

* cited by examiner

FIG.5

| sps_transform_skip_enabled_flag | u(1) |
|---|---|
| if( sps_transform_skip_enabled_flag ) | |
|    sps_bdpcm_enabled_flag | u(1) |
|    if( sps_bdpcm_enabled_flag && chroma_format_idc == 3 ) | |
|       sps_bdpcm_chroma_enabled_flag | u(1) |

FIG. 6 for luma channel :

| if( sps_bdpcm_enabled_flag && cbWidth <= MaxTsSize && cbHeight <= MaxTsSize ) | |
|---|---|
|    intra_bdpcm_luma_flag | ae(v) |
| if( intra_bdpcm_luma_flag ) | |
|    intra_bdpcm_luma_dir_flag | ae(v) | for chroma channel :

| if( cbWidth <= MaxTsSize && cbHeight <= MaxTsSize && sps_bdpcm_chroma_enabled_flag ) | |
|---|---|
|    intra_bdpcm_chroma_flag | ae(v) |
| if( intra_bdpcm_chroma_flag ) | |
|    intra_bdpcm_chroma_dir_flag | ae(v) |

FIG. 7

| | |
|---|---|
| if( tu_cbf_luma[ x0 ][ y0 ]  &&  treeType != DUAL_TREE_CHROMA ) { | |
|   if( sps_transform_skip_enabled_flag  &&  !BdpcmFlag[ x0 ][ y0 ][ 0 ]  && <br>    tbWidth  <=  MaxTsSize  &&  tbHeight  <=  MaxTsSize  && <br>    ( IntraSubPartitionsSplit[ x0 ][ y0 ]  ==  ISP_NO_SPLIT )  &&  !cu_sbt_flag ) | |
|     transform_skip_flag[ x0 ][ y0 ][ 0 ] | ae(v) |
|   if( !transform_skip_flag[ x0 ][ y0 ][ 0 ] ) | |
|     residual_coding( x0, y0, Log2( tbWidth ), Log2( tbHeight ), 0 ) | |
|   else | |
|     residual_ts_coding( x0, y0, Log2( tbWidth ), Log2( tbHeight ), 0 ) | |
| } | |
| if( tu_cbf_cb[ xC ][ yC ]  &&  treeType != DUAL_TREE_LUMA ) { | |
|   if( sps_transform_skip_enabled_flag  &&  !BdpcmFlag[ x0 ][ y0 ][ 1 ]  && <br>    wC  <=  MaxTsSize  &&  hC  <=  MaxTsSize  &&  !cu_sbt_flag ) | |
|     transform_skip_flag[ xC ][ yC ][ 1 ] | ae(v) |
|   if( !transform_skip_flag[ xC ][ yC ][ 1 ] ) | |
|     residual_coding( xC, yC, Log2( wC ), Log2( hC ), 1 ) | |
|   else | |
|     residual_ts_coding( xC, yC, Log2( wC ), Log2( hC ), 1 ) | |
| } | |
| if( tu_cbf_cr[ xC ][ yC ]  &&  treeType != DUAL_TREE_LUMA  && <br>  !( tu_cbf_cb[ xC ][ yC ]  &&  tu_joint_cbcr_residual_flag[ xC ][ yC ] ) ) { | |
|   if( sps_transform_skip_enabled_flag  &&  !BdpcmFlag[ x0 ][ y0 ][ 2 ]  && <br>    wC  <=  MaxTsSize  &&  hC  <=  MaxTsSize  &&  !cu_sbt_flag ) | |
|     transform_skip_flag[ xC ][ yC ][ 2 ] | ae(v) |
|   if( !transform_skip_flag[ xC ][ yC ][ 2 ] ) | |
|     residual_coding( xC, yC, Log2( wC ), Log2( hC ), 2 ) | |
|   else | |
|     residual_ts_coding( xC, yC, Log2( wC ), Log2( hC ), 2 ) | |
| } | |

FIG. 8a

| | |
|---|---|
| sps_transform_skip_enabled_flag | u(1) |
| if( sps_transform_skip_enabled_flag ) { | |
|   sps_bdpcm_luma_enabled_flag | u(1) |
|   if( chroma_format_idc  >= 2 ) | |
|     sps_bdpcm_chroma_enabled_flag | u(1) |
| } | |

FIG. 8b

| sps_transform_skip_enabled_flag | u(1) |
|---|---|
| if( sps_transform_skip_enabled_flag ) { | |
|     sps_bdpcm_luma_enabled_flag | u(1) |
|     if( !chroma_format_idc ) | |
|         sps_bdpcm_chroma_enabled_flag | u(1) |
| } | |

FIG. 9 for luma channel :

| if( sps_bdpcm_luma_enabled_flag && cbWidth <= MaxTsSize && cbHeight <= MaxTsSize ) | |
|---|---|
|     intra_bdpcm_luma_flag | ae(v) |
| if( intra_bdpcm_luma_flag ) | |
|     intra_bdpcm_luma_dir_flag | ae(v) | for chroma channel :

| if(cbWidth / SubWidthC <= MaxTsSize && cbHeight/ SubHeightC <= MaxTsSize) && sps_bdpcm_chroma_enabled_flag) | |
|---|---|
|     intra_bdpcm_chroma_flag | ae(v) |
| if( intra_bdpcm_chroma_flag ) | |
|     intra_bdpcm_chroma_dir_flag | ae(v) |

FIG. 10a

| sps_transform_skip_enabled_flag | u(1) |
|---|---|
| if( sps_transform_skip_enabled_flag ) { | |
|     sps_bdpcm_luma_enabled_flag | u(1) |
|     if(chroma_format_idc == 3 ) | |
|         sps_bdpcm_chroma_enabled_flag | u(1) |
| } | |

FIG. 10b

| sps_transform_skip_enabled_flag | u(1) |
|---|---|
| if( sps_transform_skip_enabled_flag ) { | |
|     sps_bdpcm_luma_enabled_flag | u(1) |
|     if( chroma_format_idc >= 2 ) | |
|         sps_bdpcm_chroma_enabled_flag | u(1) |
| } | |

FIG. 10c

| sps_transform_skip_enabled_flag | u(1) |
|---|---|
| if( sps_transform_skip_enabled_flag ) { | |
|     sps_bdpcm_luma_enabled_flag | u(1) |
|     if( !chroma_format_idc ) | |
|         sps_bdpcm_chroma_enabled_flag | u(1) |
| } | |

FIG. 11

| | |
|---|---|
| if( tu_cbf_luma[ x0 ][ y0 ]  &&  treeType != DUAL_TREE_CHROMA ) { | |
|   if( sps_transform_skip_enabled_flag  &&  ! intra_bdpcm_luma_flag [ x0 ][ y0 ]  &&<br>    tbWidth  <=  MaxTsSize  &&  tbHeight  <=  MaxTsSize  &&<br>    ( IntraSubPartitionsSplit[ x0 ][ y0 ]  ==  ISP_NO_SPLIT )  &&  !cu_sbt_flag ) | |
|     transform_skip_flag[ x0 ][ y0 ][ 0 ] | ae(v) |
|   if( !transform_skip_flag[ x0 ][ y0 ][ 0 ] ) | |
|     residual_coding( x0, y0, Log2( tbWidth ), Log2( tbHeight ), 0 ) | |
|   else | |
|     residual_ts_coding( x0, y0, Log2( tbWidth ), Log2( tbHeight ), 0 ) | |
| } | |
| if( tu_cbf_cb[ xC ][ yC ]  &&  treeType != DUAL_TREE_LUMA ) { | |
|   if( sps_transform_skip_enabled_flag  &&  ! intra_bdpcm_chroma_flag [ x0 ][ y0 ] &&  wC  <=<br>MaxTsSize  &&  hC  <=  MaxTsSize  &&  !cu_sbt_flag ) | |
|     transform_skip_flag[ xC ][ yC ][ 1 ] | ae(v) |
|   if( !transform_skip_flag[ xC ][ yC ][ 1 ] ) | |
|     residual_coding( xC, yC, Log2( wC ), Log2( hC ), 1 ) | |
|   else | |
|     residual_ts_coding( xC, yC, Log2( wC ), Log2( hC ), 1 ) | |
| } | |
| if( tu_cbf_cr[ xC ][ yC ]  &&  treeType != DUAL_TREE_LUMA  &&<br>  !( tu_cbf_cb[ xC ][ yC ]  &&  tu_joint_cbcr_residual_flag[ xC ][ yC ] ) ) { | |
|   if( sps_transform_skip_enabled_flag  &&  ! intra_bdpcm_chroma_flag [ x0 ][ y0 ]&&<br>    wC  <=  MaxTsSize  &&  hC  <=  MaxTsSize  &&  !cu_sbt_flag ) | |
|     transform_skip_flag[ xC ][ yC ][ 2 ] | ae(v) |
|   if( !transform_skip_flag[ xC ][ yC ][ 2 ] ) | |
|     residual_coding( xC, yC, Log2( wC ), Log2( hC ), 2 ) | |
|   else | |
|     residual_ts_coding( xC, yC, Log2( wC ), Log2( hC ), 2 ) | |
| } | |

FIG. 12a

| sps_transform_skip_enabled_flag | u(1) |
|---|---|
| if( sps_transform_skip_enabled_flag ) { | |
|     sps_bdpcm_luma_enabled_flag | u(1) |
|     if(chroma_format_idc  ==  3 ) | |
|         sps_bdpcm_chroma_common_enabled_flag | u(1) |
| } | |

FIG. 12b

| sps_transform_skip_enabled_flag | u(1) |
|---|---|
| if( sps_transform_skip_enabled_flag ) { | |
|     sps_bdpcm_luma_enabled_flag | u(1) |
|     if( chroma_format_idc  >= 2 ) | |
|         sps_bdpcm_chroma_common_enabled_flag | u(1) |
| } | |

FIG. 12c

| sps_transform_skip_enabled_flag | u(1) |
|---|---|
| if( sps_transform_skip_enabled_flag ) { | |
|     sps_bdpcm_luma_enabled_flag | u(1) |
|     if( !chroma_format_idc ) | |
|         sps_bdpcm_chroma_common_enabled_flag | u(1) |
| } | |

FIG. 13 for luma channel :

| | |
|---|---|
| if( sps_bdpcm_luma_enabled_flag  <=  cbWidth  <=  MaxTsSize  &&  cbHeight  <= MaxTsSize ) | |
|     intra_bdpcm_luma_flag | ae(v) |
| if( intra_bdpcm_luma_flag ) | |
|     intra_bdpcm_luma_dir_flag | ae(v) | for chroma channel:

| | |
|---|---|
| if( cbWidth / SubWidthC  <=  MaxTsSize  &&  cbHeight/ SubHeightC  <=  MaxTsSize  && sps_bdpcm_chroma_enabled_flag ) { | |
|     if( sps_bdpcm_chroma_common_enabled_flag){ | |
|         intra_bdpcm_chroma_common_flag | ae(v) |
|         if( intra_bdpcm_chroma_ common_flag ) | |
|             intra_bdpcm_chroma_ common_dir_flag | ae(v) |
|     } else { | |
|         intra_bdpcm_chroma_cb_flag | |
|         intra_bdpcm_chroma_cr_flag | |
|         if( intra_bdpcm_chroma_cb_flag ) | |
|             intra_bdpcm_chroma_cb_dir_flag | |
|         if( intra_bdpcm_chroma_cr_flag ) | |
|             intra_bdpcm_chroma_cr_dir_flag | |
|     } | |
| ... | |
| } | |

FIG. 14

```
if(sps_bdpcm_chroma_common_enabled_flag) { parse intra_bdpcm_chroma_common_flag
    BdpcmFlag[ x0 ][ y0 ][ 1 ] = BdpcmFlag[ x0 ][ y0 ][ 2 ] = intra_bdpcm_chroma_common_flag } else { parse intra_bdpcm_chroma_cb_flag
    BdpcmFlag[ x0 ][ y0 ][ 1 ] = intra_bdpcm_chroma_cb_flag
    parse intra_bdpcm_chroma_cr_flag
    BdpcmFlag[ x0 ][ y0 ][ 2 ] = intra_bdpcm_chroma_cr_flag

| sps_transform_skip_enabled_flag | u(1) |
|---|---|
| if( sps_transform_skip_enabled_flag ) | |
|     sps_inter_bdpcm_enabled_flag | u(1) |
| if( sps_inter_bdpcm_enabled_flag && chroma_format_idc == 3 ) | |
|     sps_inter_bdpcm_chroma_enabled_flag | u(1) |

FIG. 15b

| ... | |
|---|---|
| if( sps_bdpcm_enabled_flag ) | |
|     sps_inter_bdpcm_enabled_flag | u(1) |
| if( sps_inter_bdpcm_enabled_flag && chroma_format_idc == 3 ) | |
|     sps_inter_bdpcm_chroma_enabled_flag | u(1) |

FIG. 16 for luma channel :

| | |
|---|---|
| if( CuPredMode[ chType ][ x0 ][ y0 ] == MODE_INTRA || <br>    CuPredMode[ chType ][ x0 ][ y0 ] == MODE_INTER || <br>    CuPredMode[ chType ][ x0 ][ y0 ] == MODE_PLT ) { | |
|   if( treeType == SINGLE_TREE || treeType == DUAL_TREE_LUMA ) { | |
|     if( pred_mode_plt_flag ) { | |
|       palette_coding( x0, y0, cbWidth, cbHeight, treeType ) | |
|     } else { | |
|       if( sps_inter_bdpcm_enabled_flag && <br>        cbWidth <= MaxTsSize && cbHeight <= MaxTsSize ) | |
|         inter_bdpcm_luma_flag | ae(v) |
|       if( inter_bdpcm_luma_flag ) | |
|         inter_bdpcm_luma_dir_flag | ae(v) |
|       else if (CuPredMode[ chType ][ x0 ][ y0 ] != MODE_INTER){ | |
| ... | | for chroma channel :

| | |
|---|---|
|   if( !cu_act_enabled_flag ) { | |
|     if( cbWidth <= MaxTsSize && cbHeight <= MaxTsSize && <br>      sps_bdpcm_chroma_enabled_flag ) { | |
|       inter_bdpcm_chroma_flag | ae(v) |
|       if( inter_bdpcm_chroma_flag ) | |
|         inter_bdpcm_chroma_dir_flag | ae(v) |
|     } else if (CuPredMode[ chType ][ x0 ][ y0 ] != MODE_INTER) { | |
|       if( CclmEnabled ) | |
|         cclm_mode_flag | ae(v) |
|       if( cclm_mode_flag ) | |
|         cclm_mode_idx | ae(v) |
|       Else | |
|         intra_chroma_pred_mode | ae(v) |
|     } | |

FIG. 17

| | |
|---|---|
| if( tu_cbf_luma[ x0 ][ y0 ]  &&  treeType != DUAL_TREE_CHROMA ) { | |
|   if( sps_transform_skip_enabled_flag  &&  !BdpcmFlag[ x0 ][ y0 ][ 0 ]  &&<br>    tbWidth  <=  MaxTsSize  &&  tbHeight  <=  MaxTsSize  &&<br>    ( IntraSubPartitionsSplit[ x0 ][ y0 ]  ==  ISP_NO_SPLIT )  &&  !cu_sbt_flag ) | |
|     transform_skip_flag[ x0 ][ y0 ][ 0 ] | ae(v) |
|   if( !transform_skip_flag[ x0 ][ y0 ][ 0 ] ) | |
|     residual_coding( x0, y0, Log2( tbWidth ), Log2( tbHeight ), 0 ) | |
|   else | |
|     residual_ts_coding( x0, y0, Log2( tbWidth ), Log2( tbHeight ), 0 ) | |
| } | |
| if( tu_cbf_cb[ xC ][ yC ]  &&  treeType != DUAL_TREE_LUMA ) { | |
|   if( sps_transform_skip_enabled_flag  &&  !BdpcmFlag[ x0 ][ y0 ][ 1 ]  &&<br>    wC  <=  MaxTsSize  &&  hC  <=  MaxTsSize  &&  !cu_sbt_flag ) | |
|     transform_skip_flag[ xC ][ yC ][ 1 ] | ae(v) |
|   if( !transform_skip_flag[ xC ][ yC ][ 1 ] ) | |
|     residual_coding( xC, yC, Log2( wC ), Log2( hC ), 1 ) | |
|   else | |
|     residual_ts_coding( xC, yC, Log2( wC ), Log2( hC ), 1 ) | |
| } | |
| if( tu_cbf_cr[ xC ][ yC ]  &&  treeType != DUAL_TREE_LUMA  &&<br>  !( tu_cbf_cb[ xC ][ yC ]  &&  tu_joint_cbcr_residual_flag[ xC ][ yC ] ) ) { | |
|   if( sps_transform_skip_enabled_flag  &&  !BdpcmFlag[ x0 ][ y0 ][ 2 ]  &&<br>    wC  <=  MaxTsSize  &&  hC  <=  MaxTsSize  &&  !cu_sbt_flag ) | |
|     transform_skip_flag[ xC ][ yC ][ 2 ] | ae(v) |
|   if( !transform_skip_flag[ xC ][ yC ][ 2 ] ) | |
|     residual_coding( xC, yC, Log2( wC ), Log2( hC ), 2 ) | |
|   else | |
|     residual_ts_coding( xC, yC, Log2( wC ), Log2( hC ), 2 ) | |
| } | |

FIG. 18

| | |
|---|---|
| sps_transform_skip_enabled_flag | u(1) |
| if( sps_transform_skip_enabled_flag ) { | |
|   sps_bdpcm_luma_enabled_flag | u(1) |
|   if( sps_bdpcm_enabled_flag  &&  chroma_format_idc  ==  3 ) | |
|     sps_bdpcm_chroma_common_enabled_flag | u(1) |
| } | |

FIG. 19

| | |
|---|---|
| sps_transform_skip_enabled_flag | u(1) |
| if( sps_transform_skip_enabled_flag ) { | |
|   sps_bdpcm_luma_enabled_flag | u(1) |
|   if(chroma_format_idc  ==  3 ){ | |
|     sps_bdpcm_chroma_cb_enabled_flag | u(1) |
|     sps_bdpcm_chroma_cr_enabled_flag | u(1) |
| } | |

FIG. 20

| sps_transform_skip_enabled_flag | u(1) |
|---|---|
| if( sps_transform_skip_enabled_flag ) | |
|     sps_bdpcm_enabled_flag | u(1) |
| ~~if( sps_bdpcm_enabled_flag && chroma_format_idc == 3 )~~ | |
|     ~~sps_bdpcm_chroma_enabled_flag~~ | ~~u(1)~~ |

FIG. 21

| if( sps_bdpcm_enabled_flag && cbWidth <= MaxTsSize && cbHeight <= MaxTsSize ) | |
|---|---|
|     intra_bdpcm_luma_flag | ae(v) |
| if( intra_bdpcm_luma_flag ) | |
|     intra_bdpcm_luma_dir_flag | ae(v) |

FIG. 22

```
if( sps_bdpcm_enabled_flag) { if( luma channel )
    {
        parse intra_bdpcm_luma_flag
            if(intra_bdpcm_luma_flag)
            parse intra_bdpcm_luma_dir_flag
    }
    else    // chroma case
    {
        intra_bdpcm_chroma_flag = intra_bdpcm_luma_flag
        if ( intra_bdpcm_chroma_flag )
            intra_bdpcm_chroma_dir_flag = intra_bdpcm_luma_dir_flag
    }

| | |
|---|---|
| if( tu_cbf_luma[ x0 ][ y0 ] && treeType != DUAL_TREE_CHROMA ) { | |
|   if( sps_transform_skip_enabled_flag && ! intra_bdpcm_luma_flag [ x0 ][ y0 ] && <br>     tbWidth <= MaxTsSize && tbHeight <= MaxTsSize && <br>     ( IntraSubPartitionsSplit[ x0 ][ y0 ] = = ISP_NO_SPLIT ) && !cu_sbt_flag ) | |
|     transform_skip_flag[ x0 ][ y0 ][ 0 ] | ae(v) |
|   if( !transform_skip_flag[ x0 ][ y0 ][ 0 ] ) | |
|     residual_coding( x0, y0, Log2( tbWidth ), Log2( tbHeight ), 0 ) | |
|   else | |
|     residual_ts_coding( x0, y0, Log2( tbWidth ), Log2( tbHeight ), 0 ) | |
| } | |
| if( tu_cbf_cb[ xC ][ yC ] && treeType != DUAL_TREE_LUMA ) { | |
|   if( sps_transform_skip_enabled_flag && ! intra_bdpcm_luma_flag [ x0 ][ y0 ] && <br>     wC <= MaxTsSize && hC <= MaxTsSize && !cu_sbt_flag ) | |
|     transform_skip_flag[ xC ][ yC ][ 1 ] | ae(v) |
|   if( !transform_skip_flag[ xC ][ yC ][ 1 ] ) | |
|     residual_coding( xC, yC, Log2( wC ), Log2( hC ), 1 ) | |
|   else | |
|     residual_ts_coding( xC, yC, Log2( wC ), Log2( hC ), 1 ) | |
| } | |
| if( tu_cbf_cr[ xC ][ yC ] && treeType != DUAL_TREE_LUMA && <br>   !( tu_cbf_cb[ xC ][ yC ] && tu_joint_cbcr_residual_flag[ xC ][ yC ] ) ) { | |
|   if( sps_transform_skip_enabled_flag && ! intra_bdpcm_luma_flag [ x0 ][ y0 ] && <br>     wC <= MaxTsSize && hC <= MaxTsSize && !cu_sbt_flag ) | |
|     transform_skip_flag[ xC ][ yC ][ 2 ] | ae(v) |
|   if( !transform_skip_flag[ xC ][ yC ][ 2 ] ) | |
|     residual_coding( xC, yC, Log2( wC ), Log2( hC ), 2 ) | |
|   else | |
|     residual_ts_coding( xC, yC, Log2( wC ), Log2( hC ), 2 ) | |
| } | |

IMAGE ENCODING/DECODING METHOD AND APPARATUS USING BDPCM, AND RECORDING MEDIUM STORING BITSTREAM

CROSS REFERENCE TO RELATED APPLICATIONS

This application is a U.S. National Stage Application of International Application No. PCT/KR2021/000309 filed Jan. 11, 2021, which claims the benefit of KR application 10-2020-0003617 filed Jan. 10, 2020, in the Korean Intellectual Property Office, the entire disclosures of which are incorporated herein by reference for all purposes.

TECHNICAL FIELD

The present disclosure relates to an image encoding/decoding method and apparatus and a recording medium storing a bitstream and, more particularly, to an image encoding/decoding method and apparatus using a block-based differential pulse coded modulation (BDPCM) and a recording medium storing a bitstream.

BACKGROUND ART

Recently, demand for high-resolution and high-quality images such as high definition (HD) images and ultra high definition (UHD) images is increasing in various fields. As resolution and quality of image data are improved, the amount of data relatively increases as compared to existing image data. Accordingly, when image data is transmitted using a medium such as an existing wired/wireless broadband line or image data is stored using an existing storage medium, transmission and storage costs increase. In order to solve these problems that occur as resolution and quality of the image data are improved, high-efficiency image encoding/decoding technology for images having high resolution and high quality is required.

As image compression technology, there are various technologies such as inter prediction technology of predicting a pixel value included in a current picture from a picture before or after the current picture, intra prediction technology of predicting a pixel value included in a current picture using pixel information in the current picture, transform and quantization technology of compressing the energy of a residual signal, and entropy coding technology of allocating short code to a value with high frequency of occurrence and allocating long code to a value with low frequency of occurrence. Image data may be effectively compressed and transmitted or stored using such image compression technology.

DISCLOSURE

Technical Problem

An object of the present disclosure is to provide an image encoding/decoding method and apparatus with improved encoding/decoding efficiency.

In addition, another object of the present disclosure is to provide an image encoding/decoding method and apparatus for efficiently signaling BDPCM-related information.

In addition, another object of the present disclosure is to provide a method of transmitting a bitstream generated by an image encoding method or an image encoding apparatus according to the present disclosure.

In addition, another object of the present disclosure is to provide a recording medium storing a bitstream generated by an image encoding method or an image encoding apparatus according to the present disclosure.

In addition, another object of the present disclosure is to provide a recording medium storing a bitstream received, decoded and used to reconstruct an image by an image decoding apparatus according to the present disclosure.

The technical problems solved by the present disclosure are not limited to the above technical problems and other technical problems which are not described herein will become apparent to those skilled in the art from the following description.

Technical Solution

An image decoding method performed by an image decoding apparatus according to an aspect of the present disclosure may comprise obtaining first information indicating whether block-based differential pulse coded modulation (BDPCM) is applicable to a current image, obtaining second information indicating whether to apply the BDPCM to a current block in the current image based on the first information, obtaining third information indicating a prediction direction of the BDPCM based on the second information, and applying the BDPCM to the current block based on the prediction direction of the BDPCM. The first information may indicate whether BDPCM is enabled for both a luma component and a chroma component of the current block.

In the image decoding method according to the present disclosure, the first information may be transmitted at a sequence level.

In the image decoding method according to the present disclosure, the second information may be transmitted at a CU level.

In the image decoding method according to the present disclosure, the second information may be obtained when the first information indicates that the BDPCM is applicable to the current image.

In the image decoding method according to the present disclosure, the third information may be obtained when the second information indicates that the BDPCM is applied to the current block.

In the image decoding method according to the present disclosure, the second information may be obtained when a size of the current block is less than or equal to a predetermined size.

In the image decoding method according to the present disclosure, when the current block is a luma component block, the predetermined size may be a maximum block size for which transform skip is possible.

In the image decoding method according to the present disclosure, when the current block is a chroma component block, the predetermined size may be a maximum block size for which transform skip is possible, and the size of the current block may be determined based on a size of a luma component block corresponding to the current block and a chroma scaling factor.

In the image decoding method according to the present disclosure, the chroma scaling factor may be 2.

In the image decoding method according to the present disclosure, the chroma scaling factor may be determined based on a color format of the current image.

An image decoding apparatus according to another aspect of the present disclosure may comprise a memory and at least one processor. The at least one processor may obtain first information indicating whether block-based differential pulse coded modulation (BDPCM) is applicable to a current image, obtain second information indicating whether to apply the BDPCM to a current block in the current image based on the first information, obtain third information indicating a prediction direction of the BDPCM based on the second information, and apply the BDPCM to the current block based on the prediction direction of the BDPCM. The first information may indicate whether BDPCM is enabled for both a luma component and a chroma component of the current block.

An image encoding method performed by an image encoding apparatus according to another aspect of the present disclosure may comprise determining first information indicating whether block-based differential pulse coded modulation (BDPCM) is applicable to a current image, determining second information indicating whether to apply the BDPCM to a current block in the current image based on the first information, determining third information indicating a prediction direction of the BDPCM based on the second information, and applying the BDPCM to the current block based on the prediction direction of the BDPCM. The first information may indicate whether BDPCM is enabled for both a luma component and a chroma component of the current block.

In the image encoding method according to the present disclosure, the first information may be encoded at a sequence level.

In the image encoding method according to the present disclosure, the second information may be encoded at a CU level.

In the image encoding method according to the present disclosure, the second information may be encoded when the first information indicates that the BDPCM is applicable to the current image.

In the image encoding method according to the present disclosure, the third information may be encoded when the second information indicates that the BDPCM is applied to the current block.

In the image encoding method according to the present disclosure, the second information may be encoded when a size of the current block is less than or equal to a predetermined size.

In the image decoding method according to the present disclosure, when the current block is a luma component block, the predetermined size may be a maximum block size for which transform skip is possible.

In the image encoding method according to the present disclosure, when the current block is a chroma component block, the predetermined size may be a maximum block size for which transform skip is possible, and the size of the current block may be determined based on a size of a luma component block corresponding to the current block and a chroma scaling factor.

In the image encoding method according to the present disclosure, the chroma scaling factor may be 2.

In the image encoding method according to the present disclosure, the chroma scaling factor may be determined based on a color format of the current image.

An image encoding apparatus according to another aspect of the present disclosure may comprise a memory and at least one processor. The at least one processor may determine first information indicating whether block-based differential pulse coded modulation (BDPCM) is applicable to a current image, determine second information indicating whether to apply the BDPCM to a current block in the current image based on the first information, determine third information indicating a prediction direction of the BDPCM based on the second information, and apply the BDPCM to the current block based on the prediction direction of the BDPCM. The first information indicates whether BDPCM is enabled for both a luma component and a chroma component of the current block.

A transmission method according to another aspect of the present disclosure may transmit the bitstream generated by the image encoding apparatus or the image encoding method of the present disclosure.

A computer-readable recording medium according to another aspect of the present disclosure may store the bitstream generated by the image encoding apparatus or the image encoding method of the present disclosure.

A computer-readable recording medium according to another aspect of the present disclosure may store a bitstream received, decoded and used to reconstruct an image by the image decoding method or the image decoding apparatus according to the present disclosure.

The features briefly summarized above with respect to the present disclosure are merely exemplary aspects of the detailed description below of the present disclosure, and do not limit the scope of the present disclosure.

Advantageous Effects

According to the present disclosure, it is possible to provide an image encoding/decoding method and apparatus with improved encoding/decoding efficiency.

In addition, according to the present disclosure, it is possible to provide an image encoding/decoding method and apparatus for efficiently signaling BDPCM-related information.

In addition, according to the present disclosure, it is possible to provide a method of transmitting a bitstream generated by an image encoding method or an image encoding apparatus according to the present disclosure.

In addition, according to the present disclosure, it is possible to provide a recording medium storing a bitstream generated by an image encoding method or an image encoding apparatus according to the present disclosure.

In addition, according to the present disclosure, it is possible to provide a recording medium storing a bitstream received, decoded and used to reconstruct an image by an image decoding apparatus according to the present disclosure.

It will be appreciated by persons skilled in the art that that the effects that can be achieved through the present disclosure are not limited to what has been particularly described hereinabove and other advantages of the present disclosure will be more clearly understood from the detailed description.

DESCRIPTION OF DRAWINGS

FIG. 5 is a view illustrating signaling of BDPCM-related information at a sequence level according to the related art.

FIG. 6 is a view illustrating signaling BDPCM-related information at a CU level according to the related art.

FIG. 7 is a view illustrating an example in which a BDPCM flag is used at a TU syntax element signaling syntax elements for a transform block.

FIG. 8 is a view illustrating signaling of BDPCM-related information at a sequence level according to Embodiment 1 of the present disclosure.

FIG. 9 is a view illustrating signaling of BDPCM-related information at a CU level according to Embodiment 1 of the present disclosure.

FIG. 10 is a view illustrating signaling of BDPCM-related information at a sequence level according to Embodiment 2 of the present disclosure.

FIG. 11 is a view illustrating a TU-level syntax structure according to Embodiment 2 of the present disclosure.

FIG. 12 is a view illustrating signaling of BDPCM-related information at a sequence level according to Embodiment 3 of the present disclosure.

FIG. 13 is a view illustrating signaling of BDPCM-related information at a CU level according to Embodiment 3 of the present disclosure.

FIG. 14 is a view illustrating a method of parsing a CU-level syntax element for a chroma channel according to Embodiment 3 of the present disclosure.

FIG. 15 is a view illustrating signaling of BDPCM-related information at a sequence level according to Embodiment 4 of the present disclosure.

FIG. 16 is a view illustrating signaling of BDPCM-related information at a CU level according to Embodiment 4 of the present disclosure.

FIG. 17 is a view illustrating a TU-level syntax structure according to Embodiment 4 of the present disclosure.

FIG. 18 is a view illustrating signaling of BDPCM-related information at a sequence level according to Embodiment 5 of the present disclosure.

FIG. 19 is a view illustrating signaling of BDPCM-related information at a sequence level according to Embodiment 6 of the present disclosure.

FIG. 20 is a view illustrating signaling of BDPCM-related information at a sequence level according to Embodiment 7 of the present disclosure.

FIG. 21 is a view illustrating signaling of BDPCM-related information at a CU level according to Embodiment 7 of the present disclosure.

FIG. 22 is a view illustrating a process of parsing a CU-level syntax element according to Embodiment 7 of the present disclosure.

FIG. 23 is a view illustrating a TU-level syntax structure according to Embodiment 7 of the present disclosure.

Mode for Invention

Hereinafter, embodiment of the present disclosure is described in detail with reference to drawings. In describing the embodiment of the present disclosure, if it is determined that a detailed description of a related known configuration or function may obscure the subject matter of the present disclosure, the detailed description thereof will be omitted.

When it is said that a component is "coupled" or "connected" to another component, it may be directly coupled or connected to the other component, but it is understood that other components may exist in between. In addition, the description of "including" a specific component in the present disclosure does not exclude components other than the corresponding component, and it means that additional components may be included in the practice of the present disclosure or the scope of the technical spirit of the present disclosure.

In the present disclosure, terms such as first, second, etc. are used to describe various elements, but the components should not be limited by the terms. The above terms are used only for the purpose of distinguishing one component from another component. For example, without departing from the scope of the present disclosure, a first component may be referred to as a second component, and similarly, a second component may also be referred to as a first component.

In addition, the components shown in the embodiment of the present disclosure are independently illustrated to represent different characteristic functions, and it does not mean that each component is composed of separate hardware or one software constituent unit. That is, each component is listed as each component for convenience of description, and at least two components are combined to form one component, or one component can be divided into a plurality of components to perform a function, and embodiments in which these components are combined or separated are also included in the scope of the present disclosure without departing from the essence of the present disclosure.

In addition, some components are not essential components to perform an essential function in the present disclosure, but may be optional components for merely improving performance. The present disclosure may be implemented by including only essential components to implement the essence of the present disclosure, except for components used for performance improvement, and a structure including only essential components excluding optional components used for performance improvement is also included in the scope of the present disclosure.

Figure 1:
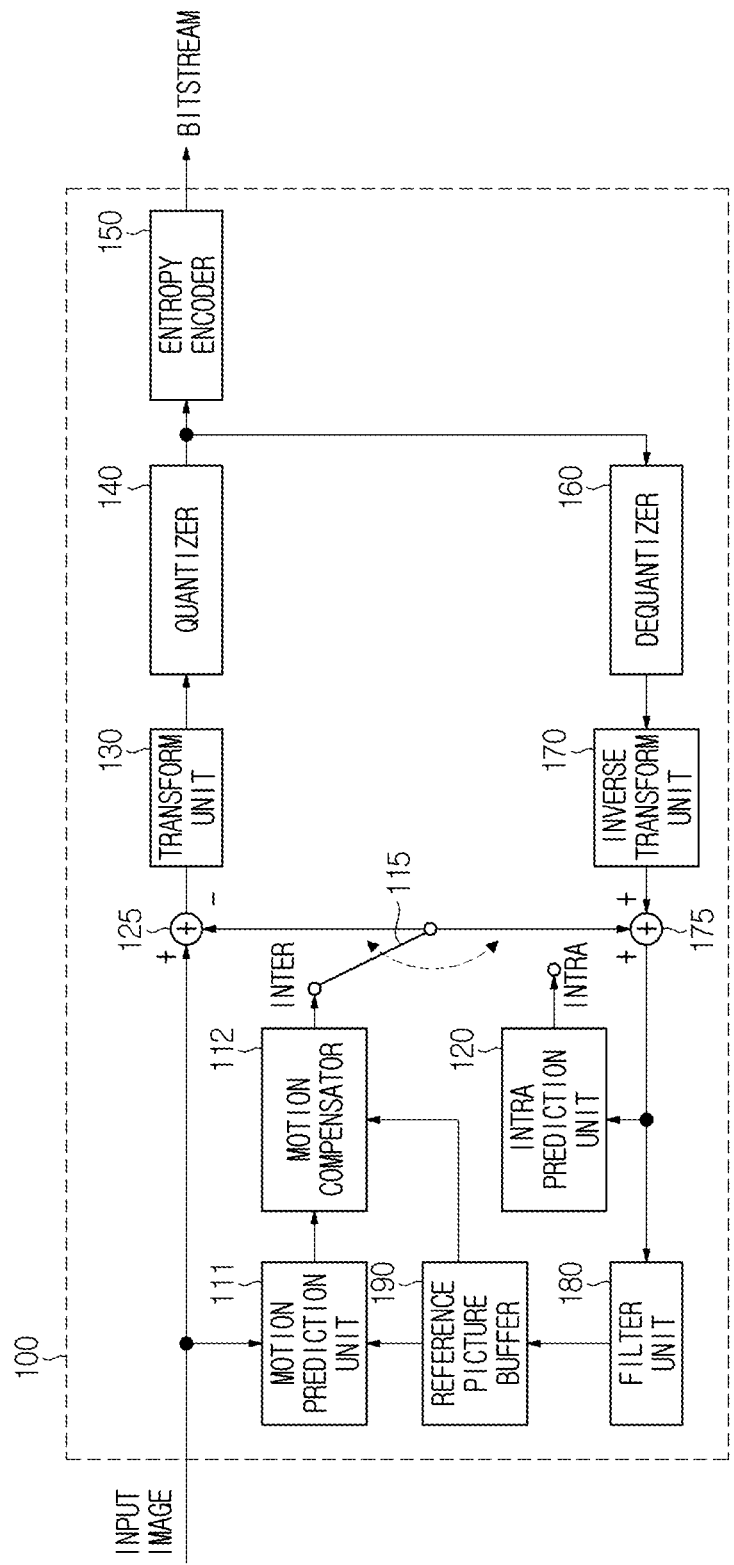
FIG. 1 is a block diagram illustrating an example of an image encoding apparatus, to which an embodiment of the present disclosure is applicable.

FIG. 1 is a block diagram illustrating an example of an image encoding apparatus, to which an embodiment of the present disclosure is applicable.

A scalable video encoding/decoding method or apparatus may be implemented by extension of a general image encoding/decoding method or apparatus that does not provide scalability, and the block diagram of FIG. 1 illustrates an embodiment of an image encoding apparatus that may be the basis of a scalable video encoding apparatus.

Referring to FIG. 1, the image encoding apparatus 100 may include a prediction unit, a subtractor 125, a transform unit 130, a quantizer 140, an entropy encoder 150, a dequantizer 160, an inverse transform unit 170, and an adder 175, a filter unit 80, and a reference picture buffer 190.

The prediction unit of the image encoding apparatus 100 may include an intra prediction unit 120 performing intra prediction, an inter prediction unit performing inter prediction, and an IBC prediction unit performing intra block copy (IBC) prediction. The inter prediction unit may include a motion prediction unit 111 and a motion compensator 112. A switch 115 may be switched between the inter prediction unit and the intra prediction unit or the IBC prediction unit (not shown) according to the prediction mode of a current block. A prediction block of the current block may be generated by performing inter prediction, intra prediction or IBC prediction on the current block. The image encoding apparatus 100 may generate a prediction block for the current block in an input image and then encode a difference between the input block and the prediction block.

When the prediction mode of the current block is an intra mode, the intra prediction unit 120 may generate the prediction block of the current block by performing spatial prediction using a pixel value of an already encoded/decoded block around the current block.

When the prediction mode of the current block is an inter mode, the motion prediction unit 111 may obtain a motion vector of the current block by searching for a region that best matches the input block in a reference picture stored in a reference picture buffer 190 in a motion prediction process. The motion compensator 112 may generate the prediction block of the current block by performing motion compensation using a motion vector and the reference picture stored in the reference picture buffer 190.

When the prediction mode of the current block is an IBC mode, the IBC prediction unit may perform motion prediction, that is, search, within the current picture to determine a region similar to the current block, and then use it as the prediction block for the current block. Also, it is possible to obtain a block vector indicating the position of the prediction block.

The subtractor 125 may generate a residual block by a difference between the input block (the current block) and the generated prediction block. The transform unit 130 may perform transform on the residual block to output a transform coefficient. In addition, the quantizer 140 may quantize the input transform coefficient according to the quantization parameter to output a quantized coefficient. At least one of transform and quantization may be omitted according to the encoding mode of the current block.

The entropy encoder 150 may entropy-encode a symbol according to a probability distribution based on the value calculated by the quantizer 140 or the encoding parameter value calculated during the encoding process, and outputs a bitstream. The output bitstream may be stored in a computer-readable recording medium or transmitted to the outside (e.g., an image decoding apparatus) through a wired or wireless transmission channel.

An entropy encoding method is a method of receiving symbols having various values, removing statistical redundancy, and expressing them as a decodable binary sequence. Here, the symbol may mean a syntax element to be encoded/decoded, a coding parameter, and a value of a residual signal. The encoding parameter is a parameter necessary for encoding and decoding, and may include not only information encoded in the encoding apparatus and transmitted to the decoding apparatus, such as syntax elements, but also information that may be inferred during the encoding or decoding process. Alternatively, the encoding parameter may mean information necessary to encode or decode an image. The encoding parameters include, for example, values or statistics of an intra/inter prediction mode, a motion/motion vector, a reference picture index, a coding block pattern, presence/absence of a residual signal, a transform coefficient, a quantized transform coefficient, a quantization parameter, a block size, block partition information, etc. Also, the residual signal may mean a difference between an original signal and a predicted signal. Alternatively, the residual signal may refer to a signal in which the difference between the original signal and the predicted signal is transformed. Alternatively, the residual signal may refer to a signal in which the difference between the original signal and the predicted signal is transformed and quantized. The residual signal may be referred to as a residual block in block units.

When entropy encoding is applied, a small number of bits are allocated to a symbol having a high occurrence probability and a large number of bits are allocated to a symbol having a low occurrence probability to express the symbol, so that the size of the bit stream for the symbols to be coded may be reduced. Accordingly, compression performance of image encoding may be improved through entropy encoding.

For entropy encoding, an encoding method such as exponential Golomb, Context-Adaptive Variable Length Coding (CAVLC), or Context-Adaptive Binary Arithmetic Coding (CABAC) may be used. For example, the entropy encoder 150 may store a table for performing entropy encoding, such as a variable length coding/code (VLC) table. The entropy encoder 150 may perform entropy encoding using a stored variable length encoding (VLC) table. In addition, the entropy encoder 150 may derive a binarization method of a target symbol and a probability model of a target symbol/bin, and then performs entropy encoding using the derived binarization method or probability model.

The quantized coefficient may be dequantized by the dequantizer 160 and inversely transformed by the inverse transform unit 170. At least one of inverse quantization and inverse transform may be omitted according to the encoding mode of the current block. A reconstructed block may be generated by adding the dequantized/inversely-transformed coefficient to the prediction block through the adder 175.

The reconstruction block may be input to the filter unit 180. The filter unit 180 may apply at least one of a deblocking filter, a sample adaptive offset (SAO), and an adaptive loop filter (ALF) to a reconstructed block or a reconstructed picture. The reconstructed block that has passed through the filter unit 180 may be stored in the reference picture buffer 190.

Figure 2:
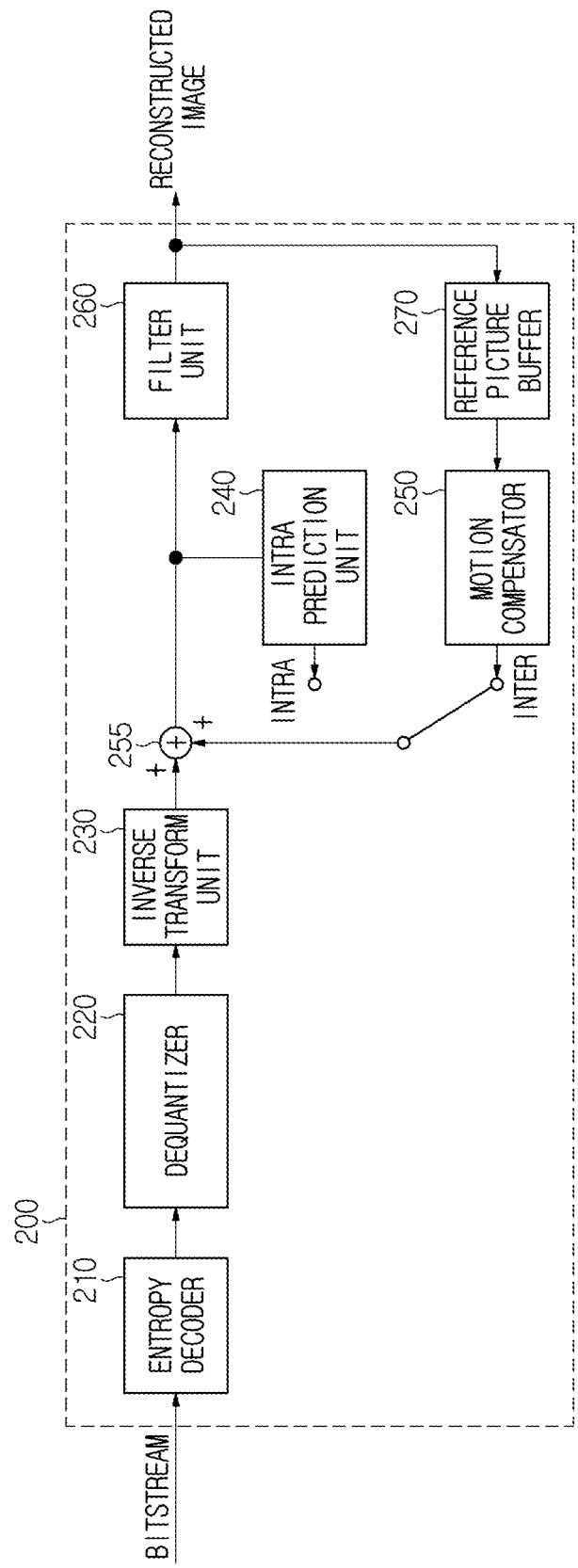
FIG. 2 is a block diagram illustrating an example of an image decoding apparatus, to which an embodiment of the present disclosure is applicable.

FIG. 2 is a block diagram illustrating an example of an image decoding apparatus, to which an embodiment of the present disclosure is applicable.

As described above in FIG. 1, the scalable video encoding/decoding method or apparatus may be implemented by extension of a general image encoding/decoding method or apparatus that does not provide scalability, and the block diagram of FIG. 2 shows an embodiment of an image decoding apparatus that may be the basis of the scalable video decoding apparatus.

Referring to FIG. 2, the image decoding apparatus 200 may include an entropy decoder 210, a dequantizer 220, an inverse transform unit 230, a prediction unit, a filter unit 260 and a reference picture buffer 270.

The image decoding apparatus 200 may receive a bitstream generated by the image encoding apparatus 100, perform decoding in an intra mode, an inter mode, or an IBC mode, and output a reconstructed image, that is, a restored image. The image decoding apparatus 200 may receive a bitstream generated by the image encoding apparatus 100 by reading the bitstream stored in a computer-readable recording medium. Alternatively, the image decoding apparatus 200 may receive the bitstream generated by the image encoding apparatus 100 through a wired or wireless transmission channel.

The image decoding apparatus 200 may generate a reconstructed block, that is, a restored block, by obtaining a reconstructed residual block from the input bitstream, generating a prediction block, and then adding the reconstructed residual block and the prediction block.

The entropy decoder 210 may entropy-decode the input bitstream according to a probability distribution to generate symbols including symbols in the form of quantized coefficients. The entropy decoding method is a method of generating each symbol by receiving a binary sequence. The entropy decoding method is similar to the entropy encoding method described above.

The quantized coefficient is dequantized by the dequantizer 220 and inversely transformed by the inverse transform unit 230, and a reconstructed residual block may be generated as a result of dequantizing/inversely transforming the quantized coefficient. At least one of dequantization and inverse transform may be omitted according to the encoding mode of the current block.

The prediction unit includes an intra prediction unit 240 performing intra prediction, a motion compensator 250 performing inter prediction, and an IBC prediction unit (not shown) performing intra block copy (IBC) prediction as detailed components.

When the prediction mode of the current block is an intra mode, the intra prediction unit 240 may generate the prediction block of the current block by performing spatial prediction using a pixel value of an already decoded block around the current block.

When the prediction mode of the current block is an inter mode, the motion compensator 250 may generate the prediction block of the current block by performing motion compensation using a motion vector and a reference picture stored in the reference picture buffer 270.

When the prediction mode of the current block is an IBC mode, the IBC prediction unit may generate a prediction block for the current block within the current picture using a block vector obtained from the bitstream.

The reconstructed residual block and the prediction block may be added through the adder 255, and the added block may be input to the filter unit 260. The filter unit 260 may apply at least one of a deblocking filter, SAO, and ALF to a reconstructed block or a reconstructed picture. The filter unit 260 may output the filtered image as a reconstructed image. The reconstructed image may be stored in the reference picture buffer 270 and used for inter prediction.

Among the entropy decoder 210, the dequantizer 220, the inverse transform unit 230, the prediction unit, the filter unit 260, and the reference picture buffer 270 included in the image decoding apparatus 200, components directly related to image decoding, for example, the entropy decoder 210, the dequantizer 220, the inverse transform unit 230, the intra prediction unit 240, the motion compensator 250, the filter unit 260, etc. may be expressed as a decoder or a decoding unit to distinguish it from other components.

In addition, the image decoding apparatus 200 may further include a parser (not shown) for parsing information related to an encoded image included in a bitstream. The parser may include the entropy decoder 210 or may be included in the entropy decoder 210 . This parser may also be implemented as one component of the decoder.

The present disclosure relates to a method of encoding/decoding an image by applying predictive encoding, various transforms, and block-based Differential Pulse Coded Modulation (BDPCM) technology to a high-resolution image such as 4K or 8K. More specifically, according to the present disclosure, encoding determination information (BDPCM-related information) determined for BDPCM technology may be encoded to be shared between channels or used independently between channels according to application and transmission channels, desired encoding performance, etc. Also, according to the present disclosure, in order to decode a compressed bitstream or compressed data encoded in this way, encoding determination information on BDPCM (BDPCM-related information) may be shared between channels or used independently for each channel.

According to the present disclosure, it is possible to improve a compression rate and image quality compared to the related art.

When encoding/decoding an image, transform is generally performed, but, in some cases, it may be advantageous not to perform transform. In particular, most pixels in a block have similar values but, if discontinuity is severe in some pixels, values of all transform coefficients are rather large when transform is performed. That is, energy compaction does not appear clearly. In this case, it may be more advantageous to omit the transform for compression. In particular, when the related art is applied to an image in which the degree of change in pixel values is spatially concentrated, problems of compression rate and image quality deterioration are severe. In this case, in particular, when the BDPCM technology of the present disclosure is used, it is possible to increase image compression efficiency or improve image quality.

According to an embodiment of the present disclosure in which BDPCM-related information is encoded to be shared between channels or used independently between channels, BDPCM flag (e.g., bdpcm_flag) information indicating whether to perform BDPCM is transmitted together with a transform skip flag (transform_skip_flag), thereby additionally obtaining good image quality while increasing the compression rate.

In the present disclosure, in describing encoding information required for decoding to be shared between channels, for convenience of overall description and understanding of the present disclosure, such as operation descriptions, drawings, and equations, etc., bdpcm_flag as encoding information required for decoding to be shared between channels will be described as an example. However, bdpcm_flag is only one specific example, and encoding information required for decoding to be shared between channels, to which the present disclosure is applied, does not mean only bdpcm_flag. In addition, although bdpcm_flag is exemplified as encoding information to be shared, in order to perform BDPCM or to decode compressed data by applying BDPCM, in addition to bdpcm_flag, information on the prediction direction of BDPCM is also required. Therefore, even when only bdpcm_flag is described for convenience of description, it is necessary to understand that, if necessary, prediction direction information for BDPCM is also included in the above-described encoding information.

In addition, in describing a channel for sharing encoding information required for decoding according to the present disclosure, a YCbCr color space will be described as an example. However, YCbCr is a specific example of the color space, and the color space targeted by the present disclosure may include various color spaces such as YUV, XYZ, RGB, and the like. In addition, a channel index cIdx indicating each channel constituting the color space may be used. cIdx may have a value of 0/1/2 (or 0/2/1) in the order of the indicated channels for YCbCr and YUV, for example. Also, for RGB and XYZ, cIdx may have a value of 1/0/2 (or 2/0/1) in the order of the indicated channels. For example, in the color space of YCbCr, cIdx of the Y channel may be 0, cIdx of the Cb channel and cIdx of the Cr channel may be 1 and 2 (or 2 and 1), respectively. For example, in the color space of RGB, cIdx of R channel may be 1 (or 2), cIdx of G channel and cIdx of B channel may be 0 and 2 (or 0 and 1), respectively.

Recently, demand for high-resolution and high-quality images such as ultra high definition (UHD) images is increasing in various fields. As resolution and quality of image data are improved, the amount of data relatively increases compared to the existing image data. Accordingly, when image data is transmitted using communication media such as wired/wireless broadband lines or various broadcast media such as satellite/terrestrial/IP network/wireless/cable/mobile communication networks or image data is stored using various storage media such as CD/DVD/USB/HD-DVD, transmission cost and storage cost increase. High-efficiency image encoding/decoding technology for images with higher resolution and image quality is required to solve these problems that inevitably deepen as the resolution and quality of the image data are gradually improved.

As image compression technology developed or being developed for this purpose, there are many technologies such as inter prediction technology of predicting pixel values included in a current picture from pictures before or after the current picture, intra prediction technology of predicting pixel values in a current picture using pixel information in the current picture, transform and quantization technology of compressing energy of a residual signal remaining as prediction error, and entropy encoding to allocate short code to a value with a high frequency of occurrence and to allocate long code to a value with a low frequency of occurrence, arithmetic encoding technology, etc., and image data can be effectively compressed and transmitted or stored using the image compression technology.

Compression technologies that may be used for image encoding are very diverse. Also, a specific technology may be advantageous over other technologies depending on the nature of the encoding target image. Accordingly, an encoder may perform the most advantageous compression on the encoding target block by adaptively determining whether to use a plurality of various compression technologies for the encoding target block. In order to select the most advantageous compression technology for the encoding target block among several selectable compression technologies, the encoder usually performs rate-distortion optimization (RDO). It is not possible to know which of various encoding technologies that may be selected for encoding an image is most optimal in terms of rate-distortion in advance. Accordingly, the encoder performs encoding (or simplified encoding) on the encoding target block using each of all possible combinations of encoding technologies, calculates rate-distortion values therefor, and determines encoding technology having the smallest rate-distortion value as final encoding technology for the encoding target block. The encoder may record the encoding technology determined according to RDO or other methods in a bitstream, and the decoder may perform an accurate inverse process (decoding) corresponding to the encoding by parsing information signaled through a bitstream to identify the encoding technology applied to the decoding target block. In this case, the information signaled through the bitstream may be referred to as "encoding information required for decoding", or more simply, "encoding information" or "encoding determination information". In particular, bdpcm flag, which is encoding information indicating whether to use the BDPCM technology, is shared between channels or used independently for each channel, so that efficient encoding may be performed according to applications.

Each channel constituting a color space such as YUV, YCbCr, RGB, XYZ, etc. of an image generally does not always have the same or similar properties between channels (or colors in the same sense). Accordingly, in terms of improvement of the compression rate, better performance may be generally obtained by making independent encoding determinations for each channel. As an example of the above-described encoding determination, there is a determination on whether to perform BDPCM on an encoding target block. Also, the determination may be coded and signaled as a syntax element such as bdpcm_flag. That is, the encoder may determine whether or not to perform BDPCM for each encoding target block, and record (encode) bdpcm_flag indicating this in a bitstream as encoding information. Also, in order to perform BDPCM (or to decode compressed data by applying BDPCM), in addition to bdpcm_flag indicating whether to perform BDPCM technology, prediction direction information for BDPCM may also be signaled.

When a conventional image compression technology is applied, transform has always been performed in image compression encoding. However, when the degree of change of spatial pixel values in an image block to be compressed is very large or, in particular, the change is very limited locally, the degree of image energy concentration at a low frequency may not be large even if transform is applied. In this case, a very large number of transform coefficients in a high-frequency region having a relatively large value may be generated. Accordingly, when a transform quantization technique that mainly maintains a low frequency signal component and removes a high frequency signal component through a quantization process after transform or reduces the amount of data by strongly applying quantization is applied, serious image quality deterioration may occur. In particular, when the change in the spatial pixel value is very large or the change in the pixel value is concentrated in a very limited local area, this problem is even greater. In order to solve this problem, it is possible to directly encode pixel values in the spatial region without transform, instead of uniformly transforming an image block. According to this technology, the encoder may determine whether to perform or omit transform for each transform block, and perform encoding by performing or omitting transform according to the determination. Information indicating whether transform is performed or omitted may be included in a bitstream and encoded.

In an artificial image such as screen content, transform skip may be advantageous. In the case of an artificial image, it is often more advantageous to perform BDPCM in which DPCM is performed for each block in addition to transform skip.

A prediction error obtained through prediction, i.e., a residual signal, may still have high spatial correlation. The BDPCM technology is technology of predicting a current pixel by using a pixel in a block closest to the current pixel in the block as a prediction pixel in consideration of such high spatial correlation. BDPCM technology often shows advantageous effects, especially in an artificial image such as screen content. Meanwhile, flag information indicating whether to perform the BDPCM technology for each block is required. An example of such flag information is bdpcm_flag. That is, when bdpcm_flag is a first value (e.g., 1), it may indicate that the BDPCM technology is used for the block. Also, when bdpcm_flag is a second value (e.g., 0), it may indicate that the BDPCM technology is not used for the block.

Figure 3:
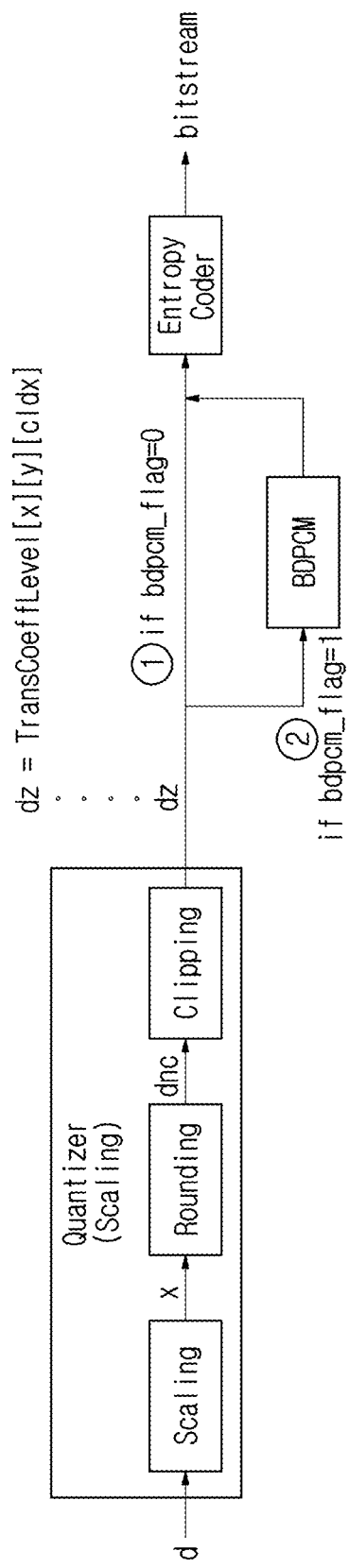
FIG. 3 is a view schematically illustrating a configuration of an encoding apparatus using BDPCM technology.

FIG. 3 is a view schematically illustrating a configuration of an encoding apparatus using BDPCM technology.

As shown in FIG. 3, the encoding apparatus may include a quantizer, a BDPCM predictor (BDPCM), and an entropy encoder. The quantizer and entropy encoder of FIG. 3 may correspond to the quantizer 140 and the entropy encoder 150 of FIG. 1, respectively.

When BDPCM is used (if bdpcm_flag=1), a BDPCM prediction residual signal may be calculated by performing, on a quantized residual signal dz, horizontal or vertical BDPCM prediction for each block. It is assumed that the size of an encoding target block is M (height)×N (width), and a quantized residual signal at a (i, j) spatial pixel position (0≤i≤M-1, 0≤j≤N-1) in this block is Q(ri,j). The BDPCM technology applies block DPCM to the quantized residual signal dz to obtain a BDPCM prediction residual signal. In this case, when the BDPCM prediction residual signal at the position (i, j) is $r'_{i,j}$, $r'_{i,j}$ may be calculated as in Equation 1 below. Here, $r_{i,j}$ means a residual signal (intra prediction error signal) corresponding to a difference between the prediction block generated by intra prediction and a current block (original block), and Q(.) means that a value in parentheses is a quantized value. Accordingly, $Q(r_{i,j})$ denotes a quantized intra prediction error signal.

• In case of vertical *BDPCM* prediction, for $0 \leq j \leq (N-1)$ [Equation 1]

$$r'_{i,j} = \begin{cases} Q(r_{i,j}), & i = 0 \\ Q(r_{i,j}) - Q(r_{(i-1),j}), & 1 \leq i \leq (M-1) \end{cases}$$

• In case of horizontal *BDPCM* prediction, for $0 \leq i \leq (M-1)$ $$r'_{i,j} = \begin{cases} Q(r_{i,j}), & j = 0 \\ Q(r_{i,j}) - Q(r_{i,(j-1)}), & 1 \leq j \leq (N-1) \end{cases}$$

When bdpcm_flag of the encoding target block is 1, BDPCM prediction may be performed according to Equation 1 above. This may correspond to the path ② of FIG. 3. If bdpcm_flag of the encoding target block is 0, BDPCM prediction is not performed, and encoding may be performed according to path ① of FIG. 3. As described above, bdpcm_flag is information (flag) indicating whether BDPCM is performed on the block.

Figure 4:
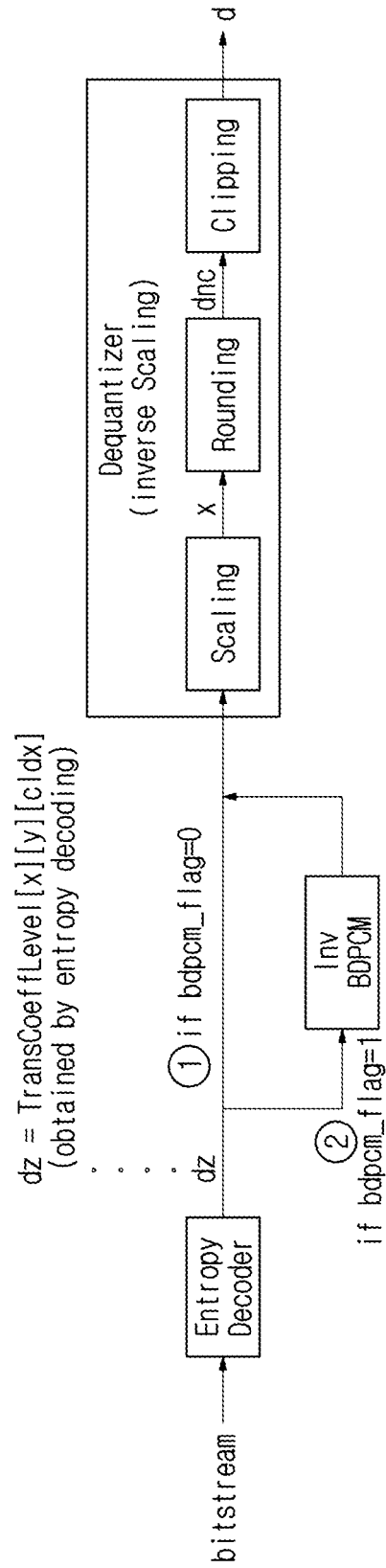
FIG. 4 is a view schematically illustrating a configuration of a decoding apparatus using BDPCM technology.

FIG. 4 is a view schematically illustrating a configuration of a decoding apparatus using BDPCM technology.

As shown in FIG. 4, the decoding apparatus may include an entropy decoder, a BDPCM predictor (Inv BDPCM), and a dequantizer. The entropy decoder and dequantizer of FIG. 4 may correspond to the entropy decoder 210 and the dequantizer 220 of FIG. 2, respectively.

BDPCM decoding may correspond to the inverse process of the BDPCM encoding process described with reference to FIG. 3, and may be performed as follows.

When BDPCM is used (if bdpcm_flag=1), the inverse process of horizontal or vertical BDPCM prediction, that is, BDPCM decoding, is performed for each block on coefficient data $r'_{i,j}$ decoded by the entropy decoder. In this case, Equation 2 below may be used. For example, the decoder may generate a quantized residual signal $Q(r_{i,j})$ by performing BDPCM prediction on $r'_{i,j}$ using Equation 2. $Q(r_{i,j})$ of the quantized residual signal may be input to the dequantizer.

In case of vertical BDPCM prediction: $Q(r_{i,j})$
$= \Sigma_{k=0}^{i} r'_{k,j}$ In case of horizontal BDPCM prediction: $Q(r_{i,j})$
$= \Sigma_{k=0}^{j} r'_{k,j}$ [Equation 2]

If bdpcm_flag of the decoding target block is 1, the inverse process of BDPCM prediction may be performed using Equation 2 above. This may correspond to the path ② of FIG. 4. If bdpcm_flag of the decoding object block is 0, the inverse process for BDPCM prediction is not performed, and decoding according to path ① of FIG. 4 may be performed.

In performing BDPCM encoding and BDPCM decoding described with reference to FIGS. 3 and 4 and Equations 1 and 2, information indicating whether to perform BDPCM (bdpcm_flag) as well as BDPCM direction information indicating the direction of BDPCM prediction are required. In general, when a target block is intra-predicted, it may be efficient to match the prediction direction of BDPCM and the prediction direction of intra prediction. Accordingly, one prediction direction (e.g., a horizontal direction or a vertical direction) may be determined and used as the prediction direction of BDPCM and the prediction direction of intra prediction.

Alternatively, when BDPCM is applied to a current block, the prediction direction of the intra prediction of the current block may be determined according to the prediction direction of BDPCM. For example, when the prediction direction of the BDPCM for the current block is a vertical direction, the prediction direction of intra prediction of the current block may be determined to be the vertical direction. In this case, since it is not necessary to signal information on the prediction direction of intra prediction of the current block, the amount of transmitted bits may be reduced.

Alternatively, the prediction direction of the BDPCM for the current block may be determined according to the prediction direction of intra prediction of the current block. For example, when the prediction direction of intra prediction of the current block is a horizontal direction (or a pseudo-horizontal direction), the prediction direction of the BDPCM for the current block may be determined to be the horizontal direction. In this case, since it is not necessary to signal the prediction direction of the BDPCM for the current block, the amount of transmitted bits can be reduced. In the above, the pseudo-horizontal direction means a direction adjacent to the horizontal direction, and for example, may include directions spaced apart from the horizontal direction by predetermined angles.

Information necessary for BDPCM decoding and a signaling method will be described later.

Whether the BDPCM technology is enabled may mean whether the BDPCM technology may be used to encode/decode a current image. In the present disclosure, "enablement" of the BDPCM technology may be described interchangeably with terms such as "availability", "applicability", "activation/deactivation", and "permissibility".

Information indicating whether the BDPCM technology is enabled may be signaled at a higher level, for example, a sequence level. For example, the information indicating whether the BDPCM technology is enabled may be bdpcm_enable_flag of a sequence parameter set (SPS). When the BDPCM technology may be used, that is, when bdpcm_enabled_flag is a first value (e.g., 1), information (e.g., bdpcm_flag) indicating whether BDPCM is used for each CU may be signaled at a CU level. Whether BDPCM is used may mean whether BDPCM is used to encode/decode a current CU. In the present disclosure, "whether to use" BDPCM may be described interchangeably with terms such as "applying" and "performing".

Information indicating whether BDPCM is used (e.g., bdpcm_flag) may be signaled only when the size of the current CU is not greater than MaxTsSize based on the luma component and the prediction mode for the current CU is an intra prediction mode. The MaxTsSize may mean a maximum block size for which a transform skip mode is allowed. bdpcm_flag indicates whether the CU is encoded with BDPCM, and, when BDPCM is used, information (e.g., bdpcm_dir_flag) indicating the prediction direction (i.e., vertical direction or horizontal direction) of BDPCM may be additionally signaled.

According to the related art, BDPCM for a chroma channel is available only when the BDPCM for a luma channel is available. In order to signal whether BDPCM is available or not, information indicating whether BDPCM is available for each of the luma channel and the chroma channel is transmitted, for example, at a sequence level (SPS). According to the related art, only when BDPCM for the luma channel is available and a color format is 4:4:4, BDPCM for the chroma channel is available. The present disclosure provide various methods for solving the problems according to the related art and systematically and more efficiently signaling BDPCM-related information.

FIG. 5 is a view illustrating signaling of BDPCM-related information at a sequence level according to the related art.

There are several technologies available for image compression. Among them, whether to use the BDPCM technology may be determined according to the image or by the determination of the encoder. For example, the encoder may allow (enable) the BDPCM technology so that the BDPCM technology is available for image compression, or may disable the BDPCM technology so that the BDPCM technology is not available. The encoder may determine whether the BDPCM is available or not, and may signal the determination to the decoder by encoding the information.

In the related art shown in FIG. 5, information indicating whether BDPCM is available is sps_bdpcm_enabled_flag and sps_bdpcm chroma enabled flag transmitted at a sequence level (SPS).

In the example shown in FIG. 5, sps_transform_skip_enabled flag indicates whether transform skip coding (transform skip mode) is available. In addition, sps_bdpcm_enabled flag indicates whether BDPCM is available for the luma channel. In addition, sps_bdpcm_chroma_enabled_flag indicates whether BDPCM is available for the chroma channel.

As shown in FIG. 5, sps_bdpcm_enabled_flag and sps_bdpcm_chroma enabled_flag are signaled only when the transform skip mode is enabled through the SPS (i.e., only when sps_transform_skip_enabled flag is 1). If sps_transform_skip enabled_flag is 0, the value of sps_bdpcm_enabled_flag is not signaled separately and is always inferred to be a value of 0.

In the example shown in FIG. 5, when the value of sps_transform_skip_enabled_flag is 1, the encoder encodes the value of sps_bdpcm_enabled_flag into 1 to allow the use of the BDPCM technology. This means that the BDPCM technology is activated, that is, enabled. More specifically, it means that the BDPCM technology is applicable to the luma channel. In the example shown in FIG. 5, sps_bdpcm_enabled_flag is information indicating whether the use of the BDPCM technology for the luma channel is enabled.

On the other hand, sps_bdpcm_chroma_enabled_flag indicates whether the use of BDPCM technology is enabled for the chroma channel. As shown in FIG. 5, sps_bdpcm_chroma_enabled_flag is signaled (transmitted or parsed) only when the value of sps_bdpcm_enabled_flag is 1 and, at the same time, the value of chroma_format_idc is 3. If these two conditions are not simultaneously satisfied, sps_bdpcm_chroma_enabled flag is not signaled, and the value of sps_bdpcm_chroma_enabled_flag is inferred to be 0. That is, when sps_bdpcm_chroma_enabled_flag is not signaled, it is determined that the BDPCM technology is not enabled for the chroma channel. Here, chroma_format_idc is information indicating the format (color format) of color channels constituting an image. If the value of chroma_format_idc is 1, it means that the color format of the YCbCr image is 4:2:0, if it is 2, it is 4:2:2, and if it is 3, it is 4:4:4.

Therefore, according to the related art, it is designed to enable the BDPCM technology for the luma channel and to enable BDPCM for the chroma channel only when the color format of the compression target image is 4:4:4. That is, the related art has a disadvantage that the use of the BDPCM technology is very limited.

FIG. 6 is a view illustrating signaling BDPCM-related information at a CU level according to the related art.

When the use of the BDPCM technology is enabled, it is necessary to signal, to the decoder, whether or not BDPCM is actually applied for each coding unit (CU). To this end, as shown in FIG. 6, intra_bdpcm_luma_flag and intra_bdpcm_luma_dir_flag information for the luma channel and intra _bdpcm_chroma_flag and intra_bdpcm_chroma_dir_flag information for the chroma channel are included in a bitstream, and are signaled from the encoder to the decoder. The information shown in FIG. 6 is information transmitted at the CU level.

In FIG. 6, intra_bdpcm_luma_flag indicates whether the BDPCM technology is applied to the luma channel of an encoding (or decoding) target block (current CU). When intra_bdpcm_luma_flag is a first value (e.g., 1), it indicates that the BDPCM technology is applied to the luma channel of the current CU. In addition, when intra_bdpcm_luma_flag is a second value (e.g., 0), it indicates that the BDPCM technology is not applied to the luma channel of the current CU.

Similarly, intra_bdpcm_chroma_flag_indicates whether BDPCM technology is applied to a chroma channel of an encoding (or decoding) target block (current CU). When intra_bdpcm_chroma_flag is a first value (e.g., 1), it indicates that BDPCM technology is applied to the chroma channel (e.g., Cb, Cr) of the current CU. In addition, when intra_bdpcm_chroma_flag is a second value (e.g., 0), it indicates that BDPCM technology is not applied to the chroma channel (e.g., Cb, Cr) of the current CU.

In order to use BDPCM technology, information indicating the prediction direction (i.e., vertical direction or horizontal direction) of BDPCM is also required. The prediction direction information is intra_bdpcm_luma_dir_flag in case of the luma channel and intra_bdpcm_chroma_dir_flag in case of the chroma channel. For example, when the value of intra_bdpcm_luma_dir_flag (or intra_bdpcm_chroma_dir_flag) is 0, it means that the prediction direction of BDPCM is vertical. When the value of intra_bdpcm_luma_dir_flag (or intra_bdpcm_chroma_dir_flag) is 1, it means that the prediction direction of BDPCM is horizontal.

The decoder parses intra_bdpcm_luma_flag (or intra_bdpcm_chroma_flag) from the bitstream received from the encoder. When the value of intra_bdpcm_luma_flag (or intra_bdpcm_chroma_flag) is 0, the decoder recognizes that BDPCM is not applied to the channel. When the value of intra_bdpcm_luma_flag (or intra_bdpcm_chroma_flag) is 1, the decoder recognizes that BDPCM is applied to the channel. The decoder decodes the bitstream according to the recognition based on the value of the flag.

In addition, when the value of intra_bdpcm_luma_flag (or intra_bdpcm_chroma_flag) is 1, the decoder parses intra_bdpcm_luma_dir_flag (or intra_bdpcm_chroma_dir_flag) from the bitstream. When the value of intra_bdpcm_luma_dir_flag (or intra_bdpcm_chroma_dir_flag) is 0, the decoder recognizes that the prediction direction of the BDPCM is a vertical direction. When the value of intra_bdpcm_luma_dir_flag (or intra_bdpcm_chroma_dir_flag) is 1, the decoder recognizes that the BDPCM prediction direction is a horizontal direction. The decoder performs BDPCM according to the recognized BDPCM prediction direction.

According to the related art described above, whether to use BDPCM is set for each of the luma channel and the chroma channel. Accordingly, BDPCM cannot be independently applied to the Cb channel and Cr channel constituting the chroma signal, respectively. For example, it is not possible to set BDPCM to be applied to the Cb channel and not to be applied to the Cr channel. That is, according to the related art, whether or not to use the BDPCM technology for the chroma channel is set to be the same for the Cb channel and the Cr channel.

FIG. 7 is a view illustrating an example in which a BDPCM flag is used at a TU syntax element signaling syntax elements for a transform block.

In the example shown in FIG. 7, (x0, y0) is spatial coordinates indicating the spatial position of the upper left side of the current encoding (or decoding) target block, and cIdx is a color channel (or component) index indicating one of the color channels of the image. That is, the Y component may correspond to cIdx=0, and the Cb component and the Cr component may correspond to cIdx=1 and cIdx=2, respectively. BdpcmFlag [x0][y0][cIdx] is a BDPCM flag for a channel indicated by cIdx of a block corresponding to spatial coordinates (x0, y0). For example, when BdpcmFlag is 1, it may indicate that BDPCM is applied to the current block, and when BdpcmFlag is 0, it may indicate that BDPCM is not applied to the current block. BDPCM flag information indicating whether BDPCM is applied to a block corresponding to the coordinates of (x0, y0) of the channel indicated by cIdx may be generally expressed as BdpcmFlag [x0][y0][cIdx]. However, in the following description, BdpcmFlag [x0][y0][cIdx] will be described as BdpcmFlag or BdpcmFlag [Channel Type], excluding some information for convenience of description, as long as there is no problem in understanding of the operation.

According to the related art described with reference to FIGS. 5 to 7, technical problems may occur in at least the following aspects.

First, the conventional bdpcm technology may be applied only to a 4:4:4 image, that is, only when chroma_format_idc is 3. Therefore, according to the related art, when the encoding/decoding target image is a 4:2:0 image (e.g., chroma_format_idc=1) or a 4:2:2 image (e.g., chroma format idc=2), even if it is expected that compression rate or image quality is improved by applying BDPCM, BDPCM cannot be applied to the image.

Second, according to the related art, it is impossible to independently enable bdpcm between the luma (i.e., the Y signal) channel and the chroma channel (i.e., the Cb signal and the Cr signal). The compression efficiency or image quality improvement effect of Bdpcm may appear mainly in the luma channel depending on the image. Alternatively, on the contrary, the effect of Bdpcm may appear only with respect to the chroma channel signal. On the other hand, in some images, it may be advantageous to use bdpcm in both the luma and chroma channels. According to the related art described with reference to FIG. 5, in order to enable the bdpcm technology for the chroma channel, the value of sps_bdpcm_enabled_flag shall be set to 1 first. That is, the bdpcm technology shall be enabled for the luma channel. This is because, according to the related art shown in FIG. 5, sps_bdpcm_chroma_enabled_flag may be parsed only when the value of sps_bdpcm_enabled flag is 1. That is, only when the bdpcm technology is enabled to be applied to the luma channel, bdpcm for the chroma channel may be enabled. In conclusion, according to the related art, it is fundamentally impossible to disable bdpcm for the luma channel and to enable bdpcm only for the chroma channel. Therefore, even if the effect of applying the bdpcm technology is obtained only in the chroma channel, if bdpcm is not enabled for the luma channel (that is, if sps_bdpcm_enabled_flag is set to 0), the encoder cannot signal sps_bdpcm_chroma_enabled_flag, and the decoder cannot parse sps_bdpcm_chroma_flag. That is, the effect of bdpcm in the chroma channel cannot be obtained. Therefore, according to the related art, even when the effect of bdpcm is obtained only in the chroma channel, it is necessary to set bdpcm to be used for the luma channel as well. That is, according to the related art, since intra_bdpcm_luma_flag and/or intra_bdpcm_luma_dir_flag values shall always be transmitted, it is inefficient. Accordingly, improvement is required to independently determine whether to apply bdpcm to the luma channel and the chroma channel and to independently signal related information (enabling information).

Third, according to the related art, whether bdpcm is available for the chroma channel is signaled by sps_bdpcm_chroma_enabled_flag transmitted from the SPS terminal, and whether bdpcm is available for the Cb channel and the Cr channel is set to be the same. Therefore, according to the related art, since there is a difference in image properties between the Cb channel and the Cr channel, even when the bdpcm technology is useful only in the Cb channel and not in the Cr channel (or vice versa), there is a problem of inefficiency that the bdpcm technology is enabled or disabled for both channels. The same problem occurs not only for sps_bdpcm_chroma_enabled_flag of FIG. 5 but also for intra_bdpcm_chroma_flag and intra_bdpcm_chroma_dir_flag of FIG. 6. That is, since the BDPCM information for the Cb channel and the BDPCM information for the Cr channel are identically determined by the same syntax element, there is a problem that the BDPCM setting for the Cb channel and the BDPCM setting for the Cr channel may not be different.

Fourth, according to the related art, bdpcm technology is applicable only to an intra-predicted block. That is, there is a problem that bdpcm cannot be used fundamentally for a block which is not intra-predicted, for example, a block that is inter-predicted by performing motion compensation.

Since BDPCM is available when transform skip is performed, it is available especially when encoding an image with lossless compression. Therefore, in the case of lossless coding or computer-generated images such as graphics images (which may be simply referred to as screen content), BDPCM is often advantageous for all YCbCr channels. Accordingly, the present disclosure includes various embodiments capable of improving image compression rate or image quality by solving at least the above problems.

In general, three-channel data of an image may be divided into a Luma (Y, or luminance) channel and a Chroma (Cb and/or Cr) channel in the YCbCr color space. BDPCM is applied in the same direction as the prediction direction indicated by the intra prediction (i.e., intra prediction) mode of the block, and quantization is performed while the transform is skipped. Accordingly, BDPCM flag information and BDPCM direction information may be transmitted (or parsed) for the Luma channel and the Chroma channel without the need to transmit BDPCM-related information through the three Y, Cb, and Cr channels. In the following description, the BDPCM flag will be described as signaling information. However, the signaling information to which the present disclosure is applied is not limited to the BDPCM flag, and may include all signaling information to which the technical spirit of the present disclosure is equally applicable. For example, the signaling information to which the present disclosure is applied may include each of the information listed above or at least one of them. Such information may be referred to as "encoding information" for convenience.

Embodiment 1

Hereinafter, an embodiment according to the present disclosure for solving the first problem of the related art described above will be described.

chroma_format_idc may indicate how a color channel is configured. If chroma_format_idc is 1, it may indicate that the YCbCr color channel is configured in a 4:2:0 color format. Also, if chroma_format_idc is 2, it may indicate that it is configured in a 4:2:2 color format, and if chromat_format idc is 3, it may indicate that it is configured in a 4:4:4 color format. According to the related art, BDPCM for the chroma block may be performed only when the value of chroma_format idc is 3, that is, when the current image is a 4:4:4 color format image. However, according to the present embodiment, not only when the current image is a 4:4:4 color format image, but also when the current image is a 4:2:2 color format image or a 4:2:0 color format image, BDPCM for the chroma block may be performed.

FIG. 8 is a view illustrating signaling of BDPCM-related information at a sequence level according to Embodiment 1 of the present disclosure.

According to the example shown in FIG. 8a, BDPCM enabling information (sps_bdpcm_chroma_enabled_flag) for a chroma block may be signaled when chroma_format_idc is greater than 2. That is, sps_bdpcm_chroma_enabled_ flag may be signaled when chroma_format_idc is 2 or 3. Accordingly, according to the example shown in FIG. 8a, when the current image is a 4:4:4 color format image or a 4:2:2 color format image, BDPCM may be enabled for the chroma block.

According to the example shown in FIG. 8b, BDPCM enabling information (sps_bdpcm_chroma_enabled_flag) for the chroma block may be signaled when chroma_format_idc is not 0. That is, sps bdpcm chroma enabled flag may be signaled when chroma_format_idc is 1, 2 or 3. Accordingly, according to the example shown in FIG. 8b, when an input image is a 4:4:4 color format image, a 4:2:2 color format image, or a 4:2:0 color format image, BDPCM is enabled for the chroma block. chroma_format_idc usually has a value of 0 to 3, and chroma_format_idc of 0 may mean that the current image is a monochrome image including only the Y channel. Accordingly, the example shown in FIG. 8b may be understood as substantially transmitting enabling information of BDPCM for the chroma block when the current image includes a chroma channel.

Alternatively, as a condition in which sps_bdpcm_chroma_enabled_flag is signaled, it may include whether separate_colour_plane_flag is 1 or not. separate_colour_plane_flag being 1 may mean that each of three color components of a 4:4:4 color format image is separately encoded/decoded. For example, the color space is not YCbCr, but is the color space of XYZ or RGB channels. That is, separate colour_plane_flag being 1 may mean that three channels of the current image need to be encoded/decoded independently of each other. In an embodiment according to the present disclosure, BDPCM may be enabled for the chroma component, except for the above cases.

When the color format of the current image is not 4:4:4, the BDPCM flag and the BDPCM prediction direction information transmission method (CU syntax level) according to the related art illustrated in FIG. 6 may no longer be used.

FIG. 9 is a view illustrating signaling of BDPCM-related information at a CU level according to Embodiment 1 of the present disclosure.

As shown in FIG. 9, parsing and decoding operation at a new CU syntax level different from that of the related art is required for the chroma channel. In FIG. 9, cbWidth and cbHeight indicate the width and height of the luma block, respectively. In addition, SubWidthC and SubHeightC may represent chroma scaling factors for matching the width and height of the luma block to the width and height of the chroma block according to the value of chroma_format_idc.

The values of SubWidthC and SubHeightC according to chroma_format_idc may be represented as shown in Table 1 below.

TABLE 1

| chroma_format_idc | separate_colour_plane_flag | Chroma format | SubWidthC | SubHeightC |
|---|---|---|---|---|
| 0 | 0 | Monochrome | 1 | 1 |
| 1 | 0 | 4:2:0 | 2 | 2 |
| 2 | 0 | 4:2:2 | 2 | 1 |
| 3 | 0 | 4:4:4 | 1 | 1 |
| 3 | 1 | 4:4:4 | 1 | 1 |

As shown in FIG. 9, when sps_bdpcm_luma_enabled_ flag is 1 and both the width (cbWidth) and the height (cbHeight) of the current luma block are less than or equal to MaxTsSize, intra_bdpcm_luma_flag may be parsed. Also, when intra_bdpcm_luma_flag is 1, intra_bdpcm_luma_dir_flag may be parsed.

Similarly, when sps_bdpcm_chroma_enabled_flag is 1 and both the width (cbWidth/SubWidthC) and the height (cbHeight/SubHeightC) of the current chroma block are less than or equal to MaxTsSize, intra_bdpcm_chroma_flag may be parsed. Also, when intra_bdpcm_chroma_flag is 1, intra_bdpcm_chroma_dir_flag may be parsed.

In Embodiment 7 to be described later, whether BDPCM is available for the luma channel and whether BDPCM is available for the chroma channel may be signaled by the same information (BDPCM enabling flag). In the case of merging the configuration of Embodiment 7 into Embodiment 1, a BDPCM enabling flag common to the luma channel and the chroma channel may be signaled. In this case, in Embodiment 1, sps_bdpcm_luma_enabled_flag and sps_bdpcm_chroma_enabled_flag may be replaced with the same common flag (e.g., sps_bdpcm_enabled_flag).

Embodiment 2

Hereinafter, an embodiment according to the present disclosure for solving the second problem of the related art will be described.

According to the present embodiment, the BDPCM enabling flags for the luma channel and the chroma channel may be transmitted (or parsed) independently of each other. According to the present embodiment, sps_bdpcm_luma_enabled_flag and sps_bdpcm_chroma_enabled_flag may be transmitted independently. sps_bdpcm_luma_enabled_flag may indicate whether BDPCM technology is enabled for the luma channel. sps_bdpcm_chroma_enabled_flag may indicate whether BDPCM technology is enabled for the chroma channel.

FIG. 10 is a view illustrating signaling of BDPCM-related information at a sequence level according to Embodiment 2 of the present disclosure.

According to the present embodiment, bdpcm_enabled_flag for the luma channel and the chroma channel may be signaled independently.

Specifically, FIG. 10a is a view illustrating an example in which bdpcm_enabled_flag for the luma channel and the chroma channel is signaled independently.

According to FIG. 10a, sps_bdpcm_chroma_enabled_flag may be signaled when chroma_format_idc is 3. In this case, sps_bdpcm_luma_enabled_flag may not be considered. That is, signaling of sps_bdpcm_chroma_enabled_flag may be performed independently of the value of sps_bdpcm_luma_enabled_flag.

The example shown in FIG. 10a is applicable to an image having a color format of 4:2:2 or 4:2:0.

FIG. 10b is a view illustrating another example of independently signaling bdpcm_enabled_flag for the luma channel and the chroma channel when a color format is 4:4:4 or 4:2:2.

As shown in FIG. 10b, when chroma_format_idc is greater than or equal to 2, sps_bdpcm_chroma_enabled_flag may be signaled, and, in this case, the value of sps_bdpcm_luma_enabled_flag may not be signaled.

FIG. 10c is a view illustrating another example of independently signaling bdpcm_enabled_flag for the luma channel and the chroma channel when a color format is 4:4:4, 4:2:2 or 4:2:0 (or it is not a monochrome image).

As shown in FIG. 10c, when chroma_format_idc is not 0, that is, when the current image is not a monochrome image, sps_bdpcm_chroma_enabled_flag may be signaled, and in this case, the value of sps bdpcm luma enabled flag may not be considered.

A method of transmitting BDPCM flag and BDPCM prediction direction information according to Embodiment 2 shown in FIG. 10 may be the same as that described with reference to FIG. 9. In this case, the method of transmitting the BDPCM flag and BDPCM prediction direction information according to the embodiment shown in FIG. 10a may be the same as that described with reference to FIG. 6.

FIG. 11 is a view illustrating a TU-level syntax structure according to Embodiment 2 of the present disclosure.

That is, whether to apply bdpcm technology for each of Y, Cb, and Cr channels of the current CU block is determined by referring to intra_bdpcm_luma_flag and intra_bdpcm_chroma_flag values obtained by parsing the CU-level syntax structure of FIG. 9, and BDPCM decoding may be performed according to this determination.

Referring to FIG. 11, in the case of the luma channel, whether to use the BDPCM technology may be indicated according to the value of intra_bdpcm_luma_flag for the current CU block to be decoded (i.e., the intra_bdpcm_luma_flag value stored in intra_bdpcm_luma_flag[x0][y0]). In the case of the Cb channel, whether to use BDPCM technology may be indicated according to the value of intra_bdpcm_chroma_flag for the current CU block to be decoded (i.e., the intra_bdpcm_chroma_flag value stored in intra_bdpcm_chroma_flag[x0][y0]). Similarly, in the case of the Cr channel, whether to use BDPCM technology may be indicated according to the value of intra_bdpcm_chroma_flag for the current CU block to be decoded (i.e., the intra_bdpcm_chroma_flag value stored in intra_bdpcm_chroma_flag[x0][y0]).

Embodiment 3

Hereinafter, an embodiment according to the present disclosure for solving the third problem of the related art will be described.

According to the present embodiment, BDPCM may be independently enabled for the Cb channel and the Cr channel. According to the present embodiment, the second and third problems of the related art can be solved at the same time. According to the present embodiment, it may be implemented to transmit sps_bdpcm_luma_enabled_flag and sps_bdpcm_chroma_common_enabled_flag. As described above, sps_bdpcm_luma_enabled_flag may indicate whether BDPCM technology is enabled for the luma channel. sps_bdpcm_chroma_common_enabled_flag may indicate whether BDPCM technology is enabled for the chroma channel. More specifically, sps_bdpcm_chroma_common_enabled_flag may indicate whether enabling of the BDPCM technology is commonly indicated for the chroma channel without distinction between the Cb channel and the Cr channel or whether it is independently indicated for each of the Cb channel and the Cr channel. For example, when the sps_bdpcm_chroma_common_enabled_flag value is 1, it may mean that BDPCM enabling is commonly indicated for the Cb channel and the Cr channel. Accordingly, in this case, two flags of intra_bdpcm_flag (i.e., intra_bdpcm_chroma_flag) and/or intra_bdpcm_dir_flag (i.e., intra_bdpcm_chroma_dir_flag) are transmitted for the chroma channel, and the Cb channel and the Cr channel may share the values. For example, when the sps_bdpcm_chroma_common_enabled_flag value is 0, intra_bdpcm_flag and/or intra_bdpcm_dir_flag may be independently transmitted (or parsed) for each of the Cb channel and the Cr channel in the CU-level syntax. That is, intra bdpcm_chroma_cb_flag and/or intra_bdpcm_chroma_cb dir_flag may be signaled for the Cb channel, and intra_bdpcm_chroma_cr_flag and/or intra_bdpcm_chroma_cr_dir_flag may be signaled for the Cr channel.

FIG. 12 is a view illustrating signaling of BDPCM-related information at a sequence level according to Embodiment 3 of the present disclosure.

According to the example shown in FIG. 12a, sps_bdpcm_chroma_common_enabled_flag may be signaled when chroma_format_idc is 3.

The example shown in FIG. 12a is applicable to an image having a color format of 4:2:2 or 4:2:0.

According to the example shown in FIG. 12b, sps_bdpcm_chroma_common_enabled_flag may be signaled when chroma_format_idc is equal to or greater than 2. That is, when the color format is 4:4:4 or 4:2:2, sps_bdpcm_chroma_common_enabled_flag may be signaled.

According to the example shown in FIG. 12c, sps_bdpcm_chroma_common_enabled_flag may be signaled when chroma_format_idc is not 0. That is, when the color format is not monochrome, for example, when the color format is 4:4:4, 4:2:2 or 4:2:0, sps_bdpcm_chroma_common_enabled_flag may be signaled.

Descriptions of common parts in the example described with reference to FIG. 12 and the example described with reference to FIG. 10 may be commonly applied. For example, in the example described with reference to FIG. 12, sps_bdpcm_chroma_common_enabled_flag for the chroma channel may be signaled independently of sps_bdpcm_luma_enabled_flag for the luma channel.

FIG. 13 is a view illustrating signaling of BDPCM-related information at a CU level according to Embodiment 3 of the present disclosure.

In the example shown in FIG. 13, a description of the same parts as in the example described with reference to FIG. 9 will be omitted.

FIG. 14 is a view illustrating a method of parsing a CU-level syntax element for a chroma channel according to Embodiment 3 of the present disclosure.

Hereinafter, signaling of the CU-level syntax according to the present embodiment will be described with reference to FIGS. 13 and 14.

First, when sps_bdpcm_chroma_common_enabled_flag is 1, intra_bdpcm_chroma_common_flag may be parsed (obtained) from a bitstream.

intra_bdpcm_chroma_common_flag may be a common flag indicating whether BDPCM is applied to all chroma channels. When intra_bdpcm_chroma_common_flag is 1, it may indicate that BDPCM is applied to all chroma channels. When intra_bdpcm_chroma_common_flag is 0, it may indicate that BDPCM is not applied to all chroma channels. Accordingly, when sps_bdpcm_chroma_common_enabled_flag is 1, the values of flags (BdpcmFlag[x0][y0][1]and BdpcmFlag[x0][y0][2]) indicating whether BDPCM is applied to the Cb channel and Cr channel may be commonly set to a value of intra_bdpcm_chroma_common_flag [x0][y0]. In this case, the value of the flag (BdpcmFlag[x0][y0][0]) indicating whether BDPCM is applied to the luma channel may be set to the value of intra_bdpcm_luma_flag [x0][y0].

If sps_bdpcm_chroma_common_enabled_flag is 0, the flag for the Cb channel (intra_bdpcm_chroma_cb_flag) and the flag for the Cr channel (intra_bdpcm_chroma_cr_flag) may be parsed (obtained) from the bitstream. intra_bdpcm_chroma_cb_flag may be a flag indicating whether BDPCM is applied to the Cb channel. When intra_bdpcm_chroma_cb_flag is 1, it may indicate that BDPCM is applied to the Cb channel. When intra_bdpcm_chroma_cb_flag is 0, it may indicate that BDPCM is not applied to the Cb channel. Similarly, intra_bdpcm_chroma_cr_flag may be a flag indicating whether BDPCM is applied to the Cr channel. When intra_bdpcm_chroma_cr_flag is 1, it may indicate that BDPCM is applied to the Cr channel. When intra_bdpcm_chroma_cr_flag is 0, it may indicate that BDPCM is not applied to the Cr channel. Therefore, when sps_bdpcm_chroma_common_enabled_flag is 0, the values of flags (BdpcmFlag[x0][y0][1]and BdpcmFlag[x0][y0][2]) indicating whether BDPCM is applied to the Cb channel and Cr channel may be set to values of intra_bdpcm_chroma_cb_ flag [x0][y0]and intra_bdpcm_chroma_cr_flag[x0][y0]respectively. In this case, the value of the flag (BdpcmFlag[x0][y0][0]) indicating whether BDPCM is applied to the luma channel may be set to a value of intra_bdpcm_luma_flag [x0][y0].

Parsing and decoding at the TU level may be performed based on BdpcmFlag[x0][y0][0]BdpcmFlag[x0][y0][1]and BdpcmFlag [x0][y0][2]set as above as described with reference to FIG. 7.

Embodiment 4

Hereinafter, an embodiment according to the present disclosure for solving the fourth problem of the related art will be described.

According to the related art, BDPCM may be applied only to blocks predicted in the intra mode (intra blocks). In addition, the prediction direction for BDPCM is used by matching it with the intra prediction direction applied to the intra block. However, when BDPCM technology, which is mainly effective for screen content, is applied to blocks predicted in inter mode (inter blocks), compression efficiency and image quality can be improved. The present embodiment can apply the BDPCM technology to the inter-block by improving the above-mentioned related art.

The encoder may determine whether to enable or disable the use of BDPCM technology for the inter block, and signal the determined content to the decoder.

FIG. 15 is a view illustrating signaling of BDPCM-related information at a sequence level according to Embodiment 4 of the present disclosure.

As shown in FIG. 15, the sequence-level syntax structure according to this embodiment may include sps_inter_bdpcm_enabled_flag and/or sps_inter_bdpcm_chroma_enabled_flag.

As shown in FIG. 15a, whether or not BDPCM technology is enabled for the inter block may be indicated by sps_inter_bdpcm_enabled_flag and sps_inter_bdpcm_chroma_enabled_flag of an SPS (Sequence Parameter Set), which is the sequence level. In addition, the two flags may be signaled only when the transform skip mode is enabled through the SPS (i.e., only when sps_transform_skip_enabled_flag is 1).

As another application example, as shown in FIG. 15b, sps_inter_bdpcm_enabled_flag and sps_inter_bdpcm_chroma_enabled_flag indicating whether to enable BDPCM technology for the inter block may be signaled only when sps_bdpcm_enabled_flag is 1, that is, only when BDPCM technology for the intra block (or all blocks) is enabled.

In the example of FIG. 15, the flag for the chroma channel is signaled depending on the flag for the luma channel. However, the present disclosure is not limited thereto, and the flag for the chroma channel may be signaled independently of the flag for the luma channel by a combination with another embodiment of the present disclosure.

In the example of FIG. 5, the flag for the chroma channel is signaled when the color format is 4:4:4. However, the present disclosure is not limited thereto, and signaling may be performed even when the color format is 4:2:2 or 4:2:0, by a combination with another embodiment of the present disclosure.

As another application example, sps_inter_bdpcm_enabled_flag and sps_inter_bdpcm_chroma_enabled_flag may be set to values of sps_intra_bdpcm_enabled_flag and sps_intra_bdpcm_chroma_enabled_flag, respectively. That is, it is possible to share the BDPCM enabling information for the intra block without change, without separately signaling the BDPCM enabling information for the inter block.

As another application example, the flag for the inter block and the flag for the intra block may be signaled as one flag. For example, sps_bdpcm_luma_enabled_flag may commonly indicate whether BDPCM is applicable to the luma channel of the inter block and the luma channel of the intra block. In addition, sps_bdpcm_chroma_enabled_flag may commonly indicate whether BDPCM is applicable to the luma channel of the inter block and the chroma channel of the intra block.

When the use of BDPCM technology is enabled for the inter block, whether BDPCM is applied for each coding unit (CU) may be signaled.

FIG. 16 is a view illustrating signaling of BDPCM-related information at a CU level according to Embodiment 4 of the present disclosure.

In the example shown in FIG. 16, inter_bdpcm_luma_flag and inter_bdpcm_luma_dir_flag may be signaled for the luma channel. Also, inter_bdpcm_chroma_flag and inter_bdpcm_chroma_dir_flag may be signaled for the chroma channel.

inter_bdpcm_luma_flag may indicate whether BDPCM is applied to the luma channel of the inter block. inter_bdpcm_luma_dir_flag may indicate the prediction direction of BDPCM for the luma channel of the inter block.

inter_bdpcm_chroma_flag may indicate whether BDPCM is applied to the chroma channel of the inter block. inter_bdpcm_chroma_dir_flag may indicate the prediction direction of BDPCM for the chroma channel of the inter block. In the case of the chroma channel, BDPCM-related information at the CU level may be signaled for each of the Cb channel and the Cr channel by a combination with another embodiment of the present disclosure described above. For example, inter_bdpcm_chroma_cb_flag and inter_bdpcm_chroma_cr_flag may be signaled instead of inter_bdpcm_chroma_flag. In addition, inter_bdpcm_chroma_cb_dir_flag and inter_bdpcm_chroma_cr_dir_flag may be signaled instead of inter_bdpcm_chroma_dir_flag.

Alternatively, in embodiments of the present disclosure, the prediction direction of BDPCM may be fixed to a predetermined direction. For example, a DC prediction mode or Planar prediction mode may be used.

FIG. 17 is a view illustrating a TU-level syntax structure according to Embodiment 4 of the present disclosure.

A redundant description of the same part in the TU-level syntax structure shown in FIG. 17 and the TU-level syntax structure described in another embodiment of the present disclosure will be omitted.

As a modification of the present embodiment, in the case of an inter block, it may be limited to apply BDPCM only to the luma block and not to apply the BDPCM to the chroma block. Alternatively, when BDPCM is applied to the luma block, the prediction direction of the BDPCM for the luma block may be equally used for the chroma block. In this case, there is an effect that it is not necessary to transmit (or parse) information on the prediction direction of the BDPCM for the chroma block.

Various embodiments of the BDPCM technology according to the present disclosure described so far may be implemented to be used together when performing transform skip. In this case, in particular, a better image quality improvement effect can be obtained by using the BDPCM technology when encoding an image with lossless compression.

Embodiment 5

According to the present embodiment, only when BDPCM is enabled for the luma channel, information indicating whether BDPCM is enabled for the chroma channel, for example, sps bdpcm chroma common enabled flag may be signaled. According to the present embodiment, the parsing of the relevant syntax element may be performed as follows.

parse sps_bdpcm_luma_enabled_flag
if (sps_bdpcm_luma_enabled_flag)
parse sps_bdpcm_chroma_common_enable_flag FIG. 18 is a view illustrating signaling of BDPCM-related information at a sequence level according to Embodiment 5 of the present disclosure.

As shown in FIG. 18, sps_transform_skip_enabled_flag is parsed and, only when the value thereof is 1, sps_bdpcm_luma_enabled_flag may be parsed. In addition, only when sps_bdpcm_luma_enabled_flag is 1, sps_bdpcm_chroma_common_enabled_flag may be parsed.

Embodiment 6

According to the present embodiment, independently of the luma channel, information indicating whether BDPCM technology is enabled for each of the Cb channel and the Cr channel may be signaled. In this case, for example, sps_bdpcm_chroma_cb_enabled_flag and sps_bdpcm_chroma_cr_enabled_flag may be used.

According to the present embodiment, parsing of the relevant syntax element may be performed as follows.

parse sps_bdpcm_luma_enabled_flag
parse sps_bdpcm_chroma_cb_enabled_flag
parse sps_bdpcm_chroma_cr_enabled_flag FIG. 19 is a view illustrating signaling of BDPCM-related information at a sequence level according to Embodiment 6 of the present disclosure.

As shown in FIG. 19, sps_transform_skip_enabled_flag is parsed, and, only when the value thereof is 1, sps_bdpcm_luma_enabled_flag may be parsed. In addition, regardless of the value of sps_bdpcm_luma_enabled_flag, when chroma_format_idc is 3, sps_bdpcm_chroma_cb_enabled_flag and sps_bdpcm_chroma_cr_enabled_flag may be parsed. In this case, the condition regarding chroma_format_idc may be changed as described in another embodiment of the present disclosure.

Embodiment 7

According to the present embodiment, when BDPCM is applied, selective information sharing between channels may be performed. That is, for an image or block for which inter-channel prediction is effective, bdpcm_enabled_flag information does not need to be signaled for each of a plurality of channels. This is because, when the similarity between channels is high, there is a high probability that values of bdpcm_enabled_flag for each channel are the same. Despite presence of these characteristics of the image, transmitting_bdpcm_enabled_flag for each of the channels constituting the image is not efficient in terms of compression rate. Therefore, the bdpcm_enabled_flag for the chroma channel may not be separately parsed under a specific condition in which the correlation (similarity) between channels is considered high. In this case, for the chroma channel, the value of bdpcm_enabled_flag for the luma channel may be shared.

FIG. 20 is a view illustrating signaling of BDPCM-related information at a sequence level according to Embodiment 7 of the present disclosure.

As shown in FIG. 20, sps_transform_skip_enabled_flag is parsed, and, only when the value thereof is 1, sps_bdpcm_luma_enabled_flag may be parsed. In addition, sps_bdpcm_chroma_enabled_flag may not be signaled. In this case, the value of sps_bdpcm_chroma_enabled_flag may be set to the value of sps_bdpcm_luma_enabled_flag.

FIG. 21 is a view illustrating signaling of BDPCM-related information at a CU level according to Embodiment 7 of the present disclosure.

As shown in FIG. 21, BDPCM-related information at the CU level may include intra_bdpcm_luma_flag and/or intra_bdpcm_luma_dir_flag for the luma channel. In this case, intra_bdpcm_chroma_flag and intra_bdpcm_chroma_dir_flag for the chroma channel may not be separately signaled.

FIG. 22 is a view illustrating a process of parsing a CU-level syntax element according to Embodiment 7 of the present disclosure.

As shown in FIG. 22, when the current block is a luma component, intra_bdpcm_luma_flag indicating whether BDPCM technology is applied may be parsed. When intra_bdpcm_luma_flag is 1, intra_bdpcm_luma_dir_flag indicating the prediction direction of BDPCM may be parsed. When the current block is a chroma component, intra_bdpcm_luma_flag and intra_bdpcm_luma_dir_flag for the luma component may be shared. Accordingly, intra_bdpcm_chroma_flag and intra_bdpcm_chroma_dir_flag may be set to values of intra_bdpcm_luma_flag and intra_bdpcm_luma_dir_flag, respectively, without parsing a separate syntax element.

FIG. 23 is a view illustrating a TU-level syntax structure according to Embodiment 7 of the present disclosure.

According to Embodiment 7 of the present disclosure, whether to apply BDPCM is determined based on a syntax element (intra_bdpcm_luma_flag) common to all three channels. Therefore, as shown in FIG. 23, when checking whether BDPCM is applied to each channel, the value of intra_bdpcm_luma_flag may be commonly used.

Embodiments 1 to 7 described above may be implemented alone or in combination of two more embodiments. When two or more embodiments are combined, whole or part of one embodiment may be combined with whole or part of another embodiment. For example, a new embodiment can be implemented by combining Embodiment 1 and Embodiment 7. More specifically, the flag (bdpcm_enabled_flag) indicating whether BDPCM is enabled may be commonly signaled for the luma channel and the chroma channel as in Embodiment 7. That is, sps_bdpcm_enabled_flag of 1 may indicate that BDPCM is applicable to both the luma channel and the chroma channel. In addition, sps_bdpcm_enabled_flag of 0 may indicate that BDPCM is not applicable to both the luma channel and the chroma channel. Also, when sps_bdpcm_enabled_flag is 1, signaling of BDPCM-related information (bdpcm_flag and/or bdpcm_dir_flag) at the CU level may be performed in consideration of the color format of the image as in Embodiment 1. More specifically, as described with reference to FIG. 9, whether intra_bdpcm_chroma_flag is signaled may be determined based on SubWidthC and SubHeightC derived according to the color format of the image.

Hereinafter, an image encoding method and an image decoding method according to an embodiment of the present disclosure will be described.

Figure 24:
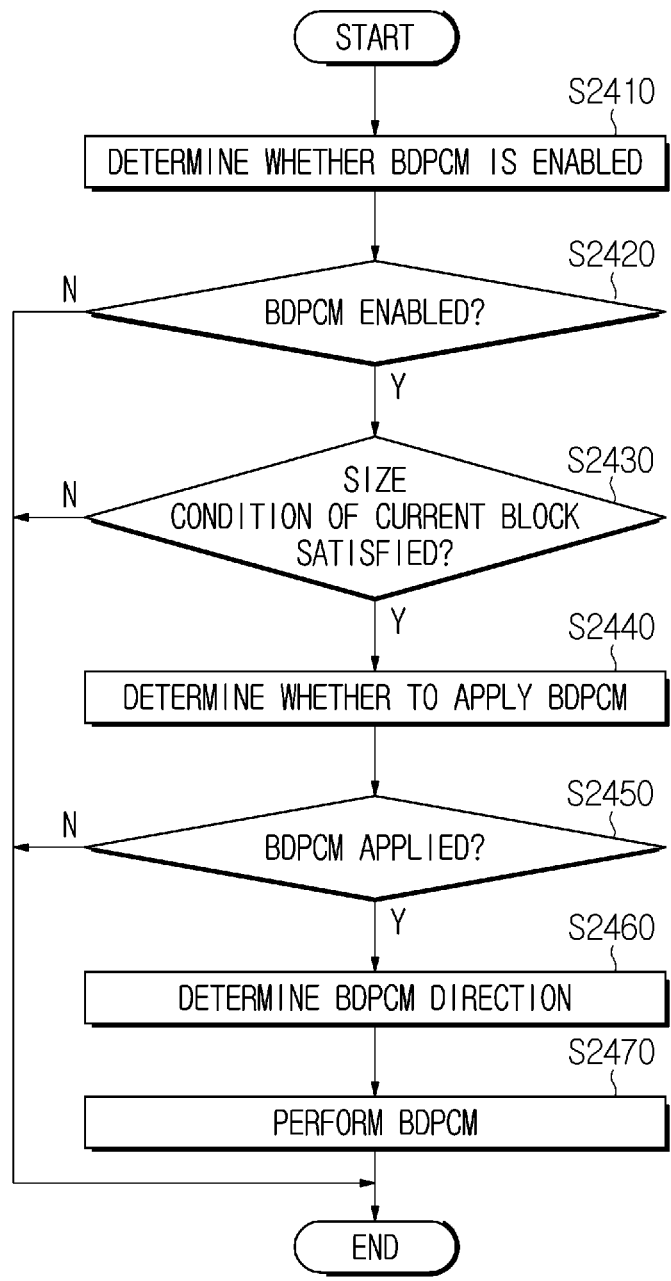
FIG. 24 is a flowchart illustrating an image encoding method of determining BDPCM-related information and performing BDPCM according to the present disclosure.

FIG. 24 is a flowchart illustrating an image encoding method of determining BDPCM-related information and performing BDPCM according to the present disclosure.

As shown in FIG. 24, the image encoding apparatus may determine whether BDPCM is enabled for a current image (S2410). The image encoding apparatus may determine whether BDPCM is enabled according to various methods such as RDO.

When BDPCM is not enabled for the current image (S2420—No), the image encoding apparatus may not perform BDPCM on the current image.

When BDPCM is enabled for the current image (S2420—Yes), the image encoding apparatus may perform BDPCM on blocks in the current image. Upon determining that BDPCM is enabled for the current image, information indicating this may be encoded in a bitstream and transmitted to an image decoding apparatus. For example, bdpcm_enabled_flag may be encoded as BDPCM enabling information. According to the present disclosure, bdpcm_enabled_flag may be signaled at a higher level (e.g., sequence level). Also, bdpcm_enabled_flag may indicate whether BDPCM is enabled for the luma channel and the chroma channel in common. In addition, according to another embodiment of the present disclosure, BDPCM enabling information (e.g., bdpcm_luma_enabled_flag) for the luma channel and BDPCM enabling information (e.g., bdpcm_chroma_enabled_flag) for the chroma channel may be signaled separately or independently. Also, according to another embodiment of the present disclosure, information (e.g., bdpcm_chroma_common_flag) indicating whether BDPCM-related information for the Cb channel and the Cr channel is common may be transmitted. In addition, according to another embodiment of the present disclosure, BDPCM enabling information (e.g., inter_bdpcm_enabled_flag) for the inter-predicted block may be transmitted separately.

When BDPCM is enabled for the current image, BDPCM may be performed only on blocks satisfying a predetermined condition. For example, when the size of the current block is less than or equal to a predetermined size, BDPCM may be performed. As described in the present disclosure, for example, when the width and height of the current block are equal to or less than MaxTsSize, BDPCM may be performed on the block. According to another embodiment of the present disclosure, when the current block is a chroma block, the width and height of the current block may be determined by dividing the size of the luma block by a predetermined chroma scaling factor. For example, when the width of the luma block is cbWidth and the height is cbHeight, and the chroma scaling factors are SubWidthC and SubHeightC, the width and height of the current chroma block may be calculated as cbWidth/SubWidthC and cbHeignt/SubHeightC. As described above, the chroma scaling factor may be derived according to the color format of the current image.

Alternatively, when the current block is a chroma block, the BDPCM flag for the current chroma block may be signaled when the width and height of the luma block are equal to or less than a value obtained by multiplying MaxTsSize and a chroma scaling factor, respectively.

When the size of the current block does not satisfy the predetermined condition (S2430—No), the image encoding apparatus may determine that BDPCM is not applied to the current block.

When the size of the current block satisfies the predetermined condition (S2430—Yes), the image encoding apparatus may determine whether to apply BDPCM to the current block (S2440). As described above, the image encoding apparatus may determine whether to apply BDPCM to encoding of the current block through various methods such as RDO.

Upon determining that BDPCM is not applied to the current block (S2450—No), the image encoding apparatus may encode the current block without applying BDPCM. In this case, the image encoding apparatus may encode the BDPCM flag (e.g., bdpcm_flag) for the current block into a second value (e.g., 0). Also, in this case, information on the prediction direction of the BDPCM may not be encoded.

Upon determining that BDPCM is applied to the current block (S2450—Yes), the image encoding apparatus may encode the BDPCM flag (e.g., bdpcm_flag) for the current block into a first value (e.g., 1). Also, the image encoding apparatus may determine a prediction direction of BDPCM (S2460), and may perform BDPCM on the current block according to the determined prediction direction. As described above, the determined prediction direction may be signaled by a BDPCM direction flag (e.g., bdpcm_dir_flag).

According to an embodiment of the present disclosure, a common BDPCM flag (bdcm_flag) may be signaled for the luma channel and the chroma channel. According to another embodiment of the present disclosure, separate BDPCM flags (bdpcm_luma_flag, bdpcm_chroma_flag) may be signaled for each of the luma channel and the chroma channel. According to another embodiment of the present disclosure, separate BDPCM flags (bdpcm_luma_flag, bdpcm_cb_flag, bdpcm_cr_flag) may be signaled for each of the luma channel, the Cb channel, and the Cr channel. According to another embodiment of the present disclosure, the BDPCM flag (inter_bdpcm_flag) for the inter-predicted block may be signaled separately.

In addition, according to an embodiment of the present disclosure, a common BDPCM direction flag (bdpcm_dir_flag) may be signaled for the luma channel and the chroma channel. According to another embodiment of the present disclosure, separate BDPCM direction flags (bdpcm_luma_dir_flag, bdpcm_chroma_dir_flag) may be signaled for each of the luma channel and the chroma channel. According to another embodiment of the present disclosure, separate BDPCM direction flags (bdpcm_luma_dir_flag, bdpcm_cb_dir_flag, bdpcm_cr_dir_flag) may be signaled for each of the luma channel, the Cb channel, and the Cr channel. According to another embodiment of the present disclosure, the BDPCM flag (inter_bdpcm_dir_flag) for the inter-predicted block may be signaled separately.

In the embodiment shown in FIG. 24, it has been described that steps S2420 and S2430 are sequentially performed prior to step S2440. However, the present disclosure is not limited thereto, and step S2430 may be performed prior to step S2420, or step S2430 and step S2420 may be performed simultaneously.

Figure 25:
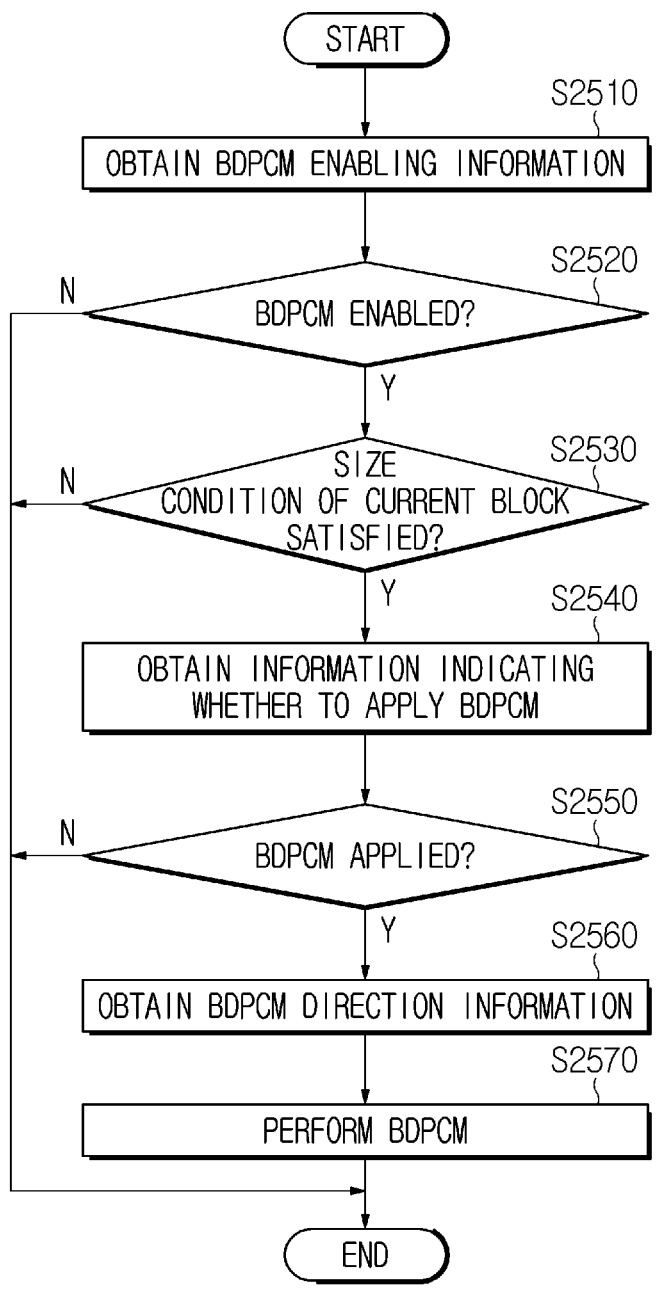
FIG. 25 is a flowchart illustrating an image decoding method of obtaining BDPCM-related information and performing BDPCM according to the present disclosure.

FIG. 25 is a flowchart illustrating an image decoding method of obtaining BDPCM-related information and performing BDPCM according to the present disclosure.

As shown in FIG. 25, the image decoding apparatus may obtain information indicating whether to enable BDPCM for a current image (BDPCM enabling information) (S2510). For example, bdpcm_enabled_flag may be obtained as BDPCM enabling information. According to the present disclosure, bdpcm_enabled_flag may be signaled at a higher level (e.g., sequence level). Also, bdpcm_enabled_flag may indicate whether BDPCM is enabled for the luma channel and the chroma channel in common. In addition, according to another embodiment of the present disclosure, BDPCM enabling information (e.g., bdpcm_luma_enabled_flag) for the luma channel and BDPCM enabling information (e.g., bdpcm_chroma_enabled_flag) for the chroma channel may be signaled separately or independently. In addition, according to another embodiment of the present disclosure, information (e.g., bdpcm_chroma_common_flag) indicating whether BDPCM-related information for the Cb channel and the Cr channel is common may be transmitted. In addition, according to another embodiment of the present disclosure, BDPCM enabling information (e.g., inter_bdpcm_enabled_flag) for the inter-predicted block may be transmitted separately.

The image decoding apparatus may determine whether BDPCM is enabled for the current image based on the obtained BDPCM enabling information (S2520). When BDPCM is not enabled for the current image (S2520—No), the image decoding apparatus may not perform BDPCM for the current image.

When BDPCM is enabled for the current image (S2520—Yes), the image decoding apparatus may perform BDPCM on blocks in the current image.

When BDPCM is enabled for the current image, BDPCM may be performed only on blocks satisfying a predetermined condition. For example, when the size of the current block is less than or equal to a predetermined size, BDPCM may be performed. As described in the present disclosure, for example, when the width and height of the current block are equal to or less than MaxTsSize, BDPCM may be performed on the block. According to another embodiment of the present disclosure, when the current block is a chroma block, the width and height of the current block may be determined by dividing the size of the luma block by a predetermined chroma scaling factor. For example, when the width of the luma block is cbWidth and the height is cbHeight, and the chroma scaling factors are SubWidthC and SubHeightC, the width and height of the current chroma block may be calculated as cbWidth/SubWidthC and cbHeignt/SubHeightC. As described above, the chroma scaling factor may be derived according to the color format of the current image.

Accordingly, when BDPCM is enabled for the current image, the image decoding apparatus may check whether the size of the current block satisfies the predetermined condition (S2530).

When the size of the current block does not satisfy the predetermined condition (S2530—No), the image decoding apparatus may determine that BDPCM is not applied to the current block.

When the size of the current block satisfies the predetermined condition (S2530—Yes), the image decoding apparatus may obtain information indicating whether to apply BDPCM to the current block (information on whether to apply BDPCM) (S2540). For example, bdpcm_flag may be obtained as information on whether BDPCM is applied.

The image decoding apparatus may determine whether to apply BDPCM to the current block based on the obtained information on whether to apply BDPCM (S2550).

Upon determining that BDPCM is not applied to the current block (S2550—No), the image decoding apparatus may decode the current block without applying BDPCM.

Upon determining that BDPCM is applied to the current block (S2550—Yes), the image decoding apparatus may obtain BDPCM direction information indicating the prediction direction of the BDPCM (S2560). For example, bdpcm_dir_flag may be obtained as BDPCM direction information.

Thereafter, the image decoding apparatus may perform BDPCM on the current block according to the prediction direction of the BDPCM determined based on the BDPCM direction information (S2570).

According to an embodiment of the present disclosure, a common BDPCM flag (bdpcm_flag) may be signaled for the luma channel and the chroma channel. According to another embodiment of the present disclosure, separate BDPCM flags (bdpcm_luma_flag, bdpcm_chroma_flag) may be signaled for each of the luma channel and the chroma channel. According to another embodiment of the present disclosure, separate BDPCM flags (bdpcm_luma_flag, bdpcm_cb_flag, bdpcm_cr_flag) may be signaled for each of the luma channel, the Cb channel, and the Cr channel. According to another embodiment of the present disclosure, the BDPCM flag (inter_bdpcm_flag) for the inter-predicted block may be signaled separately.

Also, according to an embodiment of the present disclosure, a common BDPCM direction flag (bdpcm_dir_flag)

may be signaled for the luma channel and the chroma channel. According to another embodiment of the present disclosure, separate BDPCM direction flags (bdpcm_luma_dir_flag, bdpcm_chroma_dir_flag) may be signaled for each of the luma channel and the chroma channel. According to another embodiment of the present disclosure, separate BDPCM direction flags (bdpcm_luma_dir_flag, bdpcm_cb_dir_flag, bdpcm_cr_dir_flag) may be signaled for each of the luma channel, the Cb channel, and the Cr channel. According to another embodiment of the present disclosure, the BDPCM flag (inter_bdpcm_dir_flag) for the inter-predicted block may be signaled separately.

In the embodiment shown in FIG. 25, it has been described that steps S2520 and S2530 are sequentially performed prior to step S2540. However, the present disclosure is not limited thereto, and step S2530 may be performed prior to step S2520, or step S2530 and step S2520 may be performed simultaneously.

The meaning of the syntax element described in the present disclosure may be interpreted as follows based on the name of the syntax element. "sps_" included in the name of the syntax element may indicate that the syntax element is signaled at a sequence level (e.g., a sequence parameter set). "_bdpcm_" included in the name of the syntax element may indicate that the syntax element is information related to bdpcm. "_intra_" included in the name of the syntax element may indicate that the syntax element is information related to intra prediction. "_inter_" included in the name of the syntax element may indicate that the syntax element is information related to inter prediction. "_luma_" included in the name of the syntax element may indicate that the syntax element is information related to the luma channel (component). "_chroma_" included in the name of the syntax element may indicate that the syntax element is information related to a chroma channel (component). "_cb_" included in the name of the syntax element may indicate that the syntax element is information related to a Cb channel (component). "_cr_" included in the name of the syntax element may indicate that the syntax element is information related to the Cr channel (component). "_bdpcm_ . . . _enabled_flag" included in the name of the syntax element may indicate that the syntax element is information indicating whether BDPCM is enabled. "_bdpcm_ . . . _dir_flag" included in the name of the syntax element may indicate that the syntax element is information indicating the prediction direction of BDPCM. "_chroma_common_" included in the name of the syntax element may indicate that the syntax element is information commonly applied to the chroma channel.

In the above-described embodiments, the methods are described on the basis of a flowchart as a series of steps or units, but the present disclosure is not limited to the order of steps, and some steps may occur in a different order or simultaneously with other steps as described above. In addition, a person of ordinary skill in the art will recognize that the steps shown in the flowchart are not exclusive, other steps may be included, or that one or more steps of the flowchart may be deleted without affecting the scope of the present disclosure.

The above-described embodiments include examples of various aspects. It is not possible to describe all possible combinations to represent the various aspects, but one of ordinary skill in the art will recognize that other combinations are possible. Accordingly, the present disclosure is intended to cover all other substitutions, modifications and variations falling within the scope of the following claims.

The embodiments according to the present disclosure described above may be implemented in the form of program instructions that may be executed through various computer components and recorded in a computer-readable recording medium. The computer-readable recording medium may include program instructions, data files, data structures, etc. alone or in combination. The program instructions recorded on the computer-readable recording medium may be specially designed and configured for the present disclosure, or may be known and used by those skilled in the computer software field. Examples of the computer-readable recording medium include a hard disk, a magnetic medium such as a floppy disk and a magnetic tape, an optical recording medium such as a CD-ROM and DVD, and a magneto-optical medium such as a floptical disk, and hardware devices specially configured to store and execute program instructions, such as ROM, RAM, flash memory, and the like. Examples of program instructions include not only machine language code such as those generated by a compiler, but also high-level language code that can be executed by a computer using an interpreter or the like. The hardware device may be configured to operate as one or more software modules to perform processing according to the present disclosure, and vice versa.

In the above, the present disclosure has been described with specific items such as specific components and limited embodiments and drawings, but these are provided to help a more general understanding of the present disclosure, and the present disclosure is not limited to the above embodiments, and those of ordinary skill in the art to which the present disclosure pertains may devise various modifications and variations from these descriptions.

Therefore, the spirit of the present disclosure should not be limited to the above-described embodiments, and not only the claims described below but also all modifications equally or equivalently to the claims described below belong to the scope of the spirit of the present disclosure.

INDUSTRIAL APPLICABILITY

The embodiments of the present disclosure may be used to encode or decode an image.

The invention claimed is:

1. An image decoding method performed by an image decoding apparatus, the image decoding method comprising:
obtaining first information indicating whether block-based differential pulse coded modulation (BDPCM) is applicable to a current image;
obtaining second information indicating whether to apply the BDPCM to a current block in the current image based on the first information;
obtaining third information indicating a prediction direction of the BDPCM based on the second information; and
applying the BDPCM to the current block based on the prediction direction of the BDPCM,
wherein the first information indicates whether BDPCM is enabled for both a luma component and a chroma component of the current block, and
wherein the second information for the chroma component and the third information for the chroma component are obtained from a bitstream based on a color format of the current image being a 4:2:0 color format or a 4:2:2 color format.

2. The image decoding method of claim 1, wherein the first information is transmitted at a sequence level.

3. The image decoding method of claim 1, wherein the second information is transmitted at a coding unit (CU) level.

4. The image decoding method of claim 1, wherein the second information is obtained when the first information indicates that the BDPCM is applicable to the current image.

5. The image decoding method of claim 1, wherein the third information is obtained when the second information indicates that the BDPCM is applied to the current block.

6. The image decoding method of claim 1, wherein the second information is obtained when a size of the current block is less than or equal to a predetermined size.

7. The image decoding method of claim 6, wherein, when the current block is a luma component block, the predetermined size is a maximum block size for which transform skip is possible.

8. The image decoding method of claim 6, wherein, when the current block is a chroma component block, the predetermined size is a maximum block size for which transform skip is possible, and the size of the current block is determined based on a size of a luma component block corresponding to the current block and a chroma scaling factor.

9. The image decoding method of claim 8, wherein the chroma scaling factor is 2.

10. The image decoding method of claim 8, wherein the chroma scaling factor is determined based on the color format of the current image.

11. An image encoding method performed by an image encoding apparatus, the image encoding method comprising:
determining first information indicating whether block-based differential pulse coded modulation (BDPCM) is applicable to a current image;
determining second information indicating whether to apply the BDPCM to a current block in the current image based on the first information;
determining third information indicating a prediction direction of the BDPCM based on the second information; and
applying the BDPCM to the current block based on the prediction direction of the BDPCM,
wherein the first information indicates whether BDPCM is enabled for both a luma component and a chroma component of the current block, and
wherein the second information for the chroma component and the third information for the chroma component are encoded into a bitstream based on a color format of the current image being a 4:2:0 color format or a 4:2:2 color format.

12. The image encoding method of claim 11, wherein the first information is encoded at a sequence level.

13. The image encoding method of claim 11, wherein the second information is encoded at a coding unit (CU) level.

14. The image encoding method of claim 11, wherein the second information is encoded when the first information indicates that the BDPCM is applicable to the current image.

15. The image encoding method of claim 11, wherein the third information is encoded when the second information indicates that the BDPCM is applied to the current block.

16. The image encoding method of claim 11, wherein the second information is encoded when a size of the current block is less than or equal to a predetermined size.

17. The image encoding method of claim 16, wherein, when the current block is a luma component block, the predetermined size is a maximum block size for which transform skip is possible.

18. The image encoding method of claim 16, wherein, when the current block is a chroma component block, the predetermined size is a maximum block size for which transform skip is possible, and the size of the current block is determined based on a size of a luma component block corresponding to the current block and a chroma scaling factor.

19. The image encoding method of claim 18, wherein the chroma scaling factor is 2.

20. The image encoding method of claim 18, wherein the chroma scaling factor is determined based on the color format of the current image.

21. An image decoding apparatus comprising:
a memory; and
at least one processor,
wherein the at least one processor is configured to:
obtain first information indicating whether block-based differential pulse coded modulation (BDPCM) is applicable to a current image;
obtain second information indicating whether to apply the BDPCM to a current block in the current image based on the first information;
obtain third information indicating a prediction direction of the BDPCM based on the second information; and
apply the BDPCM to the current block based on the prediction direction of the BDPCM,
wherein the first information indicates whether BDPCM is enabled for both a luma component and a chroma component of the current block, and
wherein the second information for the chroma component and the third information for the chroma component are obtained from a bitstream based on a color format of the current image being a 4:2:0 color format or a 4:2:2 color format.

22. An image encoding apparatus comprising:
a memory; and
at least one processor,
wherein the at least one processor is configured to:
determine first information indicating whether block-based differential pulse coded modulation (BDPCM) is applicable to a current image;
determine second information indicating whether to apply the BDPCM to a current block in the current image based on the first information;
determine third information indicating a prediction direction of the BDPCM based on the second information; and
apply the BDPCM to the current block based on the prediction direction of the BDPCM, wherein the first information indicates whether BDPCM is enabled for both a luma component and a chroma component of the current block, and
wherein the second information for the chroma component and the third information for the chroma component are encoded into a bitstream based on a color format of the current image being a 4:2:0 color format or a 4:2:2 color format.

23. A method for transmitting a bitstream generated by an image encoding method, the image encoding method comprising:
determining first information indicating whether block-based differential pulse coded modulation (BDPCM) is applicable to a current image;
determining second information indicating whether to apply the BDPCM to a current block in the current image based on the first information;

determining third information indicating a prediction direction of the BDPCM based on the second information; and applying the BDPCM to the current block based on the prediction direction of the BDPCM, wherein the first information indicates whether BDPCM is enabled for both a luma component and a chroma component of the current block, and wherein the second information for the chroma component and the third information for the chroma component are encoded into a bitstream based on a color format of the current image being a 4:2:0 color format or a 4:2:2 color format.

* * * * *